US010971025B2

(12) United States Patent
Kojo

(10) Patent No.: US 10,971,025 B2
(45) Date of Patent: Apr. 6, 2021

(54) INFORMATION DISPLAY APPARATUS, INFORMATION DISPLAY TERMINAL, METHOD OF CONTROLLING INFORMATION DISPLAY APPARATUS, METHOD OF CONTROLLING INFORMATION DISPLAY TERMINAL, AND COMPUTER READABLE RECORDING MEDIUM

(71) Applicant: CASIO COMPUTER CO., LTD., Tokyo (JP)

(72) Inventor: Takashi Kojo, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 295 days.

(21) Appl. No.: 15/925,736

(22) Filed: Mar. 19, 2018

(65) Prior Publication Data

US 2018/0277009 A1    Sep. 27, 2018

(30) Foreign Application Priority Data

Mar. 23, 2017 (JP) .............................. JP2017-057238

(51) Int. Cl.
*G09B 7/04* (2006.01)
*G06T 11/60* (2006.01)
(Continued)

(52) U.S. Cl.
CPC ................ *G09B 7/04* (2013.01); *G06T 11/60* (2013.01); *G09B 5/02* (2013.01); *G09B 5/12* (2013.01);
(Continued)

(58) Field of Classification Search
CPC ... G09B 7/00; G09B 7/02; G09B 7/06; G09B 7/04; G09B 5/02; G09B 5/12;
(Continued)

(56) References Cited

U.S. PATENT DOCUMENTS 4,456,973 A * 6/1984 Carlgren ............... G06F 40/247
704/1
6,154,757 A 11/2000 Krause et al.
(Continued)

FOREIGN PATENT DOCUMENTS

JP    06236138 A    8/1994
JP    07078148 A    3/1995
(Continued)

OTHER PUBLICATIONS

Office Action (Non-Final Rejection) dated Mar. 26, 2020 issued in U.S. Appl. No. 15/925,696.
(Continued)

*Primary Examiner* — Jack Yip
(74) *Attorney, Agent, or Firm* — Holtz, Holtz & Volek PC

(57) ABSTRACT

According to one embodiment, there is provided an information display apparatus including a processor, the processor being configured to: designate a character string in a text displayed in a display unit in accordance with a user operation; determine whether a keyword is included in a part of the designated character string; generate, if it is determined that the keyword is included in the part of the designated character string, problem setting data based on the keyword included in the designated character string; and transmit the problem setting data to an external terminal.

16 Claims, 11 Drawing Sheets

(51) Int. Cl.
  *G09B 19/00* (2006.01)
  *G09B 5/12* (2006.01)
  *G09B 5/02* (2006.01)
  *G09B 19/04* (2006.01)
  *G09B 19/06* (2006.01)
  *G06F 3/0484* (2013.01)

(52) U.S. Cl.
  CPC ......... *G09B 19/00* (2013.01); *G09B 19/0046* (2013.01); *G09B 19/04* (2013.01); *G09B 19/06* (2013.01); *G06F 3/04847* (2013.01)

(58) Field of Classification Search
  CPC .... G09B 19/00; G09B 19/0046; G09B 19/04; G09B 19/06; G06T 11/60; G06F 3/04847
  See application file for complete search history.

(56) References Cited

U.S. PATENT DOCUMENTS

| | | | |
|---|---|---|---|
| 6,175,841 B1* | 1/2001 | Loiacono | G09B 7/02 434/353 |
| 7,717,712 B2 | 5/2010 | Brun et al. | |
| 8,250,071 B1 | 8/2012 | Killalea et al. | |
| 9,460,162 B1* | 10/2016 | Ostler | G06F 11/3684 |
| 9,466,225 B2 | 10/2016 | Mori et al. | |
| 9,812,028 B1 | 11/2017 | Elchik et al. | |
| 10,460,023 B1* | 10/2019 | Shriver | G06F 3/0486 |
| 2004/0023191 A1* | 2/2004 | Brown | G09B 17/00 434/156 |
| 2005/0079477 A1 | 4/2005 | Diesel et al. | |
| 2007/0072164 A1 | 3/2007 | Katsuyama et al. | |
| 2007/0136657 A1 | 6/2007 | Blumenthal et al. | |
| 2007/0269775 A1 | 11/2007 | Andreev et al. | |
| 2007/0298384 A1 | 12/2007 | Jenkins et al. | |
| 2008/0318200 A1 | 12/2008 | Hau et al. | |
| 2010/0021871 A1* | 1/2010 | Layng | G09B 7/02 434/178 |
| 2010/0273138 A1* | 10/2010 | Edmonds | G09B 3/00 434/322 |
| 2011/0093292 A1 | 4/2011 | Hussam | |
| 2011/0093481 A1 | 4/2011 | Hussam | |
| 2012/0329013 A1 | 12/2012 | Chibos | |
| 2013/0073932 A1* | 3/2013 | Migos | G06F 3/0483 715/201 |
| 2013/0073998 A1 | 3/2013 | Migos et al. | |
| 2013/0080471 A1 | 3/2013 | Forte et al. | |
| 2013/0275120 A1 | 10/2013 | Degross | |
| 2014/0024009 A1 | 1/2014 | Nealon et al. | |
| 2014/0335497 A1 | 11/2014 | Gal et al. | |
| 2015/0044653 A1* | 2/2015 | Levine | G09B 23/288 434/262 |
| 2015/0088932 A1 | 3/2015 | Sauz | |
| 2015/0104762 A1 | 4/2015 | Luke et al. | |
| 2015/0106703 A1 | 4/2015 | Fraundorf et al. | |
| 2015/0254999 A1* | 9/2015 | Goll | G09B 5/06 434/169 |
| 2015/0375093 A1* | 12/2015 | Casey | A63F 1/04 273/292 |
| 2016/0155348 A1 | 6/2016 | Hall | |
| 2017/0293826 A1 | 10/2017 | Kemmochi et al. | |
| 2018/0011830 A1* | 1/2018 | Iida | G06F 40/169 |
| 2018/0126260 A1* | 5/2018 | Chansoriya | A63F 9/183 |
| 2018/0277006 A1 | 9/2018 | Kojo | |
| 2018/0277008 A1 | 9/2018 | Kojo | |

FOREIGN PATENT DOCUMENTS

| | | | |
|---|---|---|---|
| JP | 2002062792 | A | 2/2002 |
| JP | 2002268536 | A | 9/2002 |
| JP | 2003036016 | A | 2/2003 |
| JP | 2004258184 | A | 9/2004 |
| JP | 2005070939 | A | 3/2005 |
| JP | 2007094055 | A | 4/2007 |
| JP | 2010175699 | A | 8/2010 |
| JP | 2010284797 | A | 12/2010 |
| JP | 2013072927 | A | 4/2013 |
| JP | 2013161463 | A | 8/2013 |
| JP | 2014038209 | A | 2/2014 |
| JP | 2015125561 | A | 7/2015 |
| JP | 2016156883 | A | 9/2016 |
| JP | 2017049529 | A | 3/2017 |
| WO | 2016117321 | A1 | 7/2016 |

OTHER PUBLICATIONS

Office Action (Non-Final Rejection) dated Mar. 31, 2020 issued in U.S. Appl. No. 15/925,715.
Related U.S. Appl. No. 15/925,696; First Named Inventor: Takashi Kojo; Title: "Information Display Apparatus, Information Display Method, and Computer-Readable Recording Medium"; filed Mar. 19, 2018.
Related U.S. Appl. No. 15/925,715; First Named Inventor: Takashi Kojo; Title: "Information Display Apparatus, Information Display Method, and Computer-Readable Recording Medium"; filed Mar. 19, 2018.
Office Action (Final Rejection) dated Oct. 13, 2020 issued in related U.S. Appl. No. 15/925,715.
Japanese Office Action (and English language translation thereof) dated Oct. 13, 2020 issued in Japanese Application No. 2017-055584.
Notice of Allowance dated Dec. 11, 2020 issued in related U.S. Appl. No. 15/925,696.
Japanese Office Action (and English language translation thereof) dated Dec. 1, 2020 issued in Japanese Application No. 2017-057238.
Yuji, et al., "Information Exchange", 3 Making of electronic blackboard/ notebook system that is possible, Research Report vol. 2001 No. 122 of Information Processing Society, Incorporated Information Processing Society, Dec. 14, 2001, pp. 33-40.

* cited by examiner

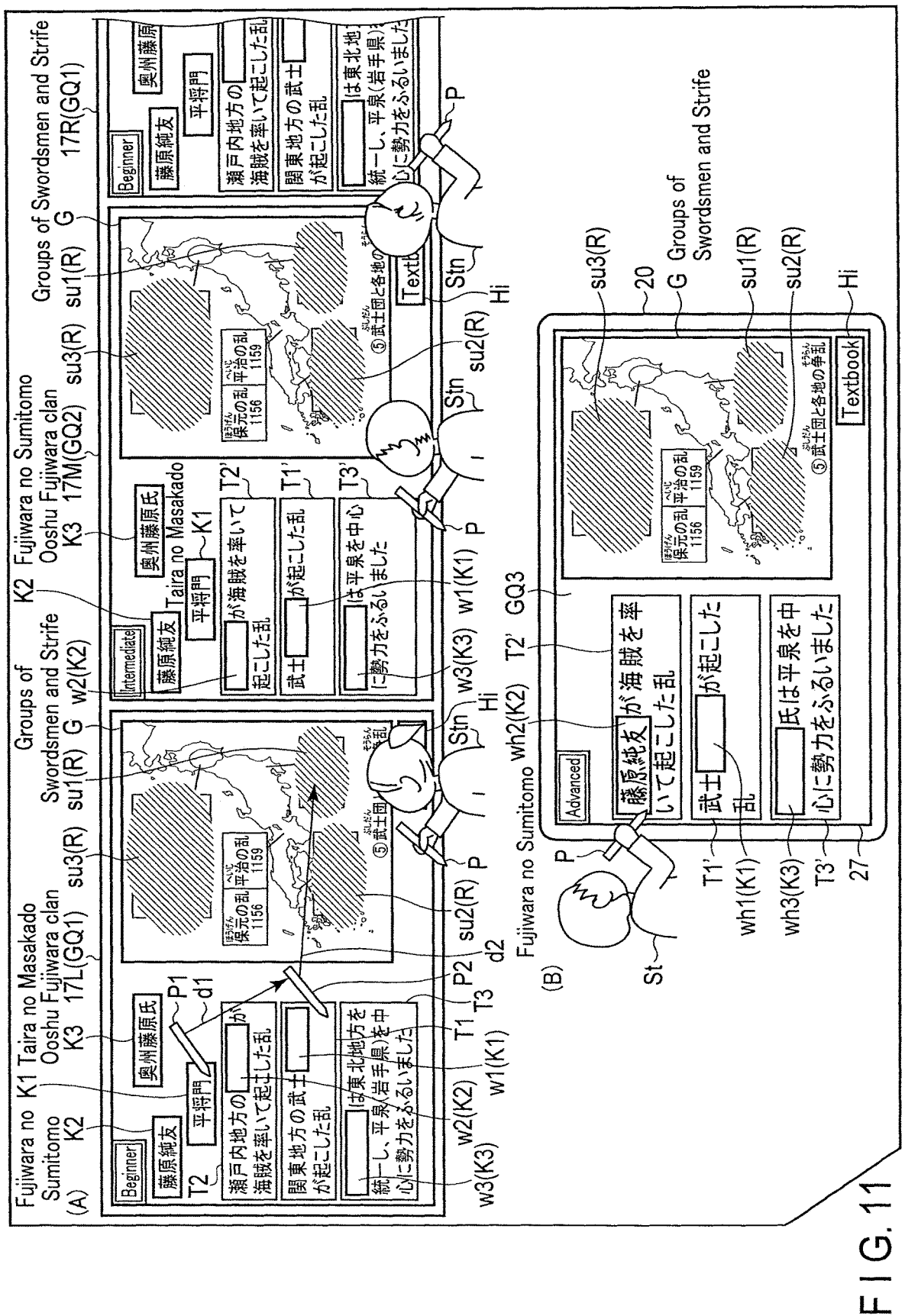
F I G. 11

INFORMATION DISPLAY APPARATUS, INFORMATION DISPLAY TERMINAL, METHOD OF CONTROLLING INFORMATION DISPLAY APPARATUS, METHOD OF CONTROLLING INFORMATION DISPLAY TERMINAL, AND COMPUTER READABLE RECORDING MEDIUM

CROSS-REFERENCE TO RELATED APPLICATIONS

This application is based upon and claims the benefit of priority from prior Japanese Patent Application No. 2017-057238, filed Mar. 23, 2017, the entire contents of which are incorporated herein by reference.

BACKGROUND OF THE INVENTION

1. Field of the Invention

The present invention relates to an information display apparatus, an information display terminal, a method of controlling an information display apparatus, a method of controlling an information display terminal, and a computer-readable recording medium.

2. Description of the Related Art

In a conventionally-conceived system, education or learning is carried out by using electronic educational materials.

In this system, for example, a learning support server, which is connected to a Web server that provides educational material information and examination problems to terminals of lecture attendants, stores educational material proposal effect information which is obtained by analyzing answer histories of multiple lecture attendants. When examination problems that are presented to the lecture attendants require knowledge of other already learned educational materials in addition to the educational materials learned this time, educational materials that are effective for the lecture attendants are selected based on the answer history information for each lecture attendant and the above-described educational materials proposal effect information. The selected educational materials are reported to the Web server as the next proposed educational materials. Thereby, in accordance with the examination results, the next educational materials suitable for the lecture attendants can be presented. As an e-learning system that has already been proposed, see, for example, Jpn. Pat. Appln. KOKAI Publication No. 2010-175699.

Specifically, the conventional e-learning system presents the next educational materials suitable for lecture attendants from among the other already learned educational materials, based on the examination results of the test problems prepared in advance. Thereby, knowledge, which was already learned but is considered insufficient in lecture attendants, is presented once again. Thereby, additional learning is provided to the lecture attendants after the lecture.

BRIEF SUMMARY OF THE INVENTION

According to one embodiment, there is provided an information display apparatus including a processor, the processor being configured to: designate a character string in a text displayed in a display unit in accordance with a user operation; determine whether a keyword is included in a part of the designated character string; generate, if it is determined that the keyword is included in the part of the designated character string, problem setting data based on the keyword included in the designated character string; and transmit the problem setting data to an external terminal.

According to another embodiment, there is provided an information display terminal including a receiver; and a processor; wherein the receiver receives problem setting data based on a character string in a text displayed in the display unit from an outside of the terminal, and a keyword included in the character string, and the processor generates a problem in accordance with the problem setting data and causes the display unit to display the problem.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 11 is a diagram illustrating another embodiment of a problem outputting process in accordance with the lecturer terminal process (part 2) of the electronic blackboard (lecturer terminal) 10 and a problem outputting process in accordance with the lecture attendant process of the lecture attendant terminal 20.

DETAILED DESCRIPTION OF THE PREFERRED EMBODIMENTS

Embodiments of the present invention will be described hereinafter with reference to the accompanying drawings.

Figure 1:
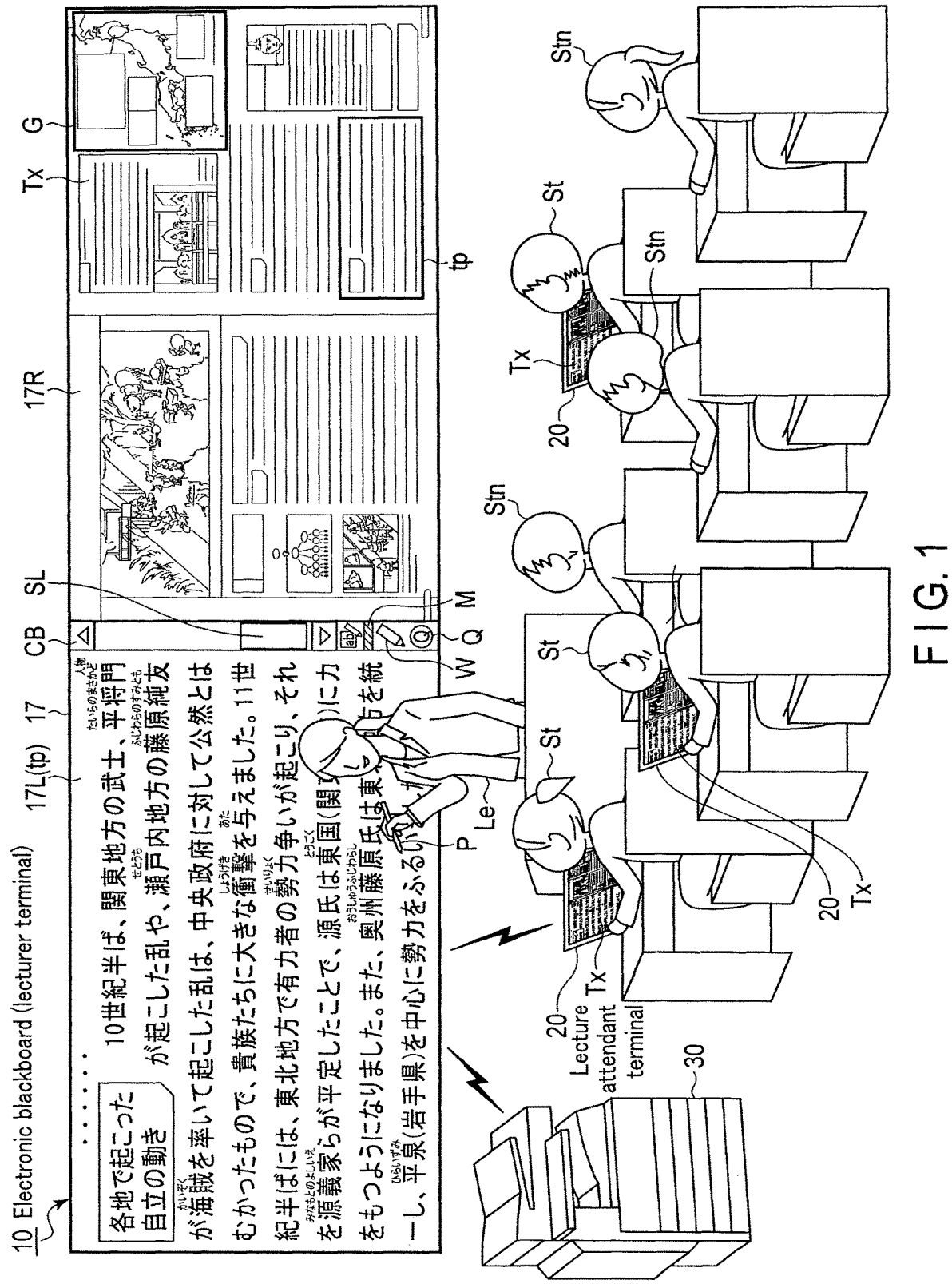
FIG. 1 is a conceptual view of an electronic lecture system using an electronic blackboard (lecturer terminal) 10 and a lecture attendant terminal 20 according to an embodiment of the information display apparatus and the information display terminal of the present invention.

FIG. 1 is a conceptual view of an electronic lecture system using an electronic blackboard (lecturer terminal) 10 and a lecture attendant terminal 20 according to an embodiment of the information display apparatus and the information display terminal of the present invention.

The electronic lecture system includes a blackboard (lecturer terminal) 10 operated mainly by a lecturer Le (e.g., an instructor), a lecture attendant terminal 20 operated by a lecture attendant St (e.g., a student), and a printer apparatus 30, and each of them has a communication function to perform data communication with each other.

The electronic blackboard (lecturer terminal) 10 includes a touch panel (touched position detection device)-equipped color display 17 (17L/CB/17R) having a display screen with a size that can serve as a blackboard or a whiteboard used for lectures, and has a left screen 17L and a right screen 17R for displaying data divided into the left and right, as shown in FIG. 1. Multiple divided screens, for example a left screen 17L, a center screen 17M, and a right screen 17R (see FIGS. 10 and 11), may constitute the touch panel-equipped color display 17.

The electronic blackboard (lecturer terminal) 10 may be composed of, for example, a tablet terminal, or a personal computer having a touch panel-equipped display. Display data, which is generated and displayed by the personal computer or the like, maybe displayed on a large-screen display device for lectures, on which the left screen 17L and the right screen 17R, or the left screen 17L, the center screen 17M, and the right screen 17R, are set.

The electronic blackboard (lecturer terminal) 10 may be configured to include a normal blackboard (or whiteboard) (corresponding to the left screen 17L) which itself does not have a display function; a large-screen display device (corresponding to the right screen 17R) which is placed next to the blackboard 10; a pen position sensor which detects a designated position and a movement of a pen P on the blackboard 10; an imaging recognition device which captures an image shown on the normal blackboard (the left screen 17L) and recognizes characters or pictures included in the captured image or an image displayed on the display device (the right screen 17R); and an image generation device which generates an image based on the position/locus of the pen P on the blackboard 10 detected by the pen position sensor and the characters or pictures on the blackboard 10 recognized by the imaging recognition device; a projector device that projects and displays the image generated by the image generation device on the normal blackboard (the left screen 17L); a display control device which causes the display device (the right screen 17R) to display an image generated by the image generation device; and a control device (CPU) that controls an entire electronic blackboard system that includes the display device (the right screen 17R), the pen position sensor, the image recognition device, the image generation device, the projector device, and the display control device.

The lecture attendant terminal 20 is composed of a tablet terminal, or the like.

In the following, the electronic blackboard of the electronic lecture system will be explained as an electronic blackboard (lecturer terminal) 10 having a touch panel-equipped color display 17.

Data of an entire two-page spread Tx of a textbook of a lecture subject (electronic textbook) is displayed on the right screen 17R of the electronic blackboard (lecturer terminal) 10. Data of a text part tp included in the two-page spread Tx displayed on the right screen 17R is enlarged and displayed on the left screen 17L.

A control box CB is arranged between the left screen 17L and the right screen 17R of the electronic blackboard (lecturer terminal) 10, and the enlarged text part tp in the two-page spread Tx displayed on the left screen 17L is scrolled by moving the scroll icon SL in the control box CB.

In addition to the scroll icon SL, a marker icon M for setting a color of a marker (e.g., underlines) to be displayed on the left screen 17L, a handwriting icon W for setting a handwriting input mode, and a problem-setting icon Q for instructing problem-setting are arranged in the control box CB.

The lecturer Le indicates important persons and items, etc. using a pen P on the two-page spread Tx of the textbook (electronic textbook) displayed on the right screen 17R, and the enlarged text part tp of the two-page spread Tx displayed on the left screen 17L. In the process of giving a lecture, in the electronic blackboard (lecturer terminal) 10, problem-setting data in accordance with lecture content is generated, and a problem screen GQ (see FIGS. 10 and 11) of a problem generated based on the problem-setting data is displayed and output at an appropriate timing according to a user (lecturer Le) operation. The problem-setting data is distributed to each lecture attendant terminal 20 from the electronic blackboard (lecturer terminal) 10, and the problem screen GQ (see FIGS. 10 and 11) of the problem generated based on the problem-setting data is displayed and output on the lecture attendant terminal 20.

A lecture attendant St who has the lecture attendant terminal 20 attends a lecture, displaying a two-page spread Tx of a textbook (electronic textbook), which is a lecture subject, on the lecture attendant terminal 20. In the lecture attendant terminal 20, the problem screen GQ (see FIGS. 10 and 11) of the problem generated based on the problem setting data distributed from the electronic blackboard (lecturer terminal) 10 through a wireless communication is displayed and output, and the lecture attendant St can learn through answering the problem in the displayed problem screen GQ.

At an appropriate timing according to a user (lecturer Le) operation, the electronic blackboard (lecturer terminal) 10 transmits and outputs the problem screen GQ (see FIGS. 10 and 11) of the problem generated based on the problem setting data to the printer apparatus 30, and prints the problem screen GQ.

A lecture attendant Stn who attends a lecture without the lecture attendant terminal 20 refers to a two-page spread Tx of a paper textbook (textbook) which is a subject of the lecture. The lecture attendant Stn can learn thorough answering a problem in the problem screen GQ (see FIGS. 10 and 11) displayed on the electronic blackboard (lecturer terminal) 10, and answering a problem in the problem screen GQ which is printed by the printer apparatus 30.

Thus, even the lecture attendant Stn who does not have a lecture attendant terminal 20 can attend a lecture and learn through answering problems, like the lecture attendant St who has the lecture attendant terminal 20.

Figure 2:
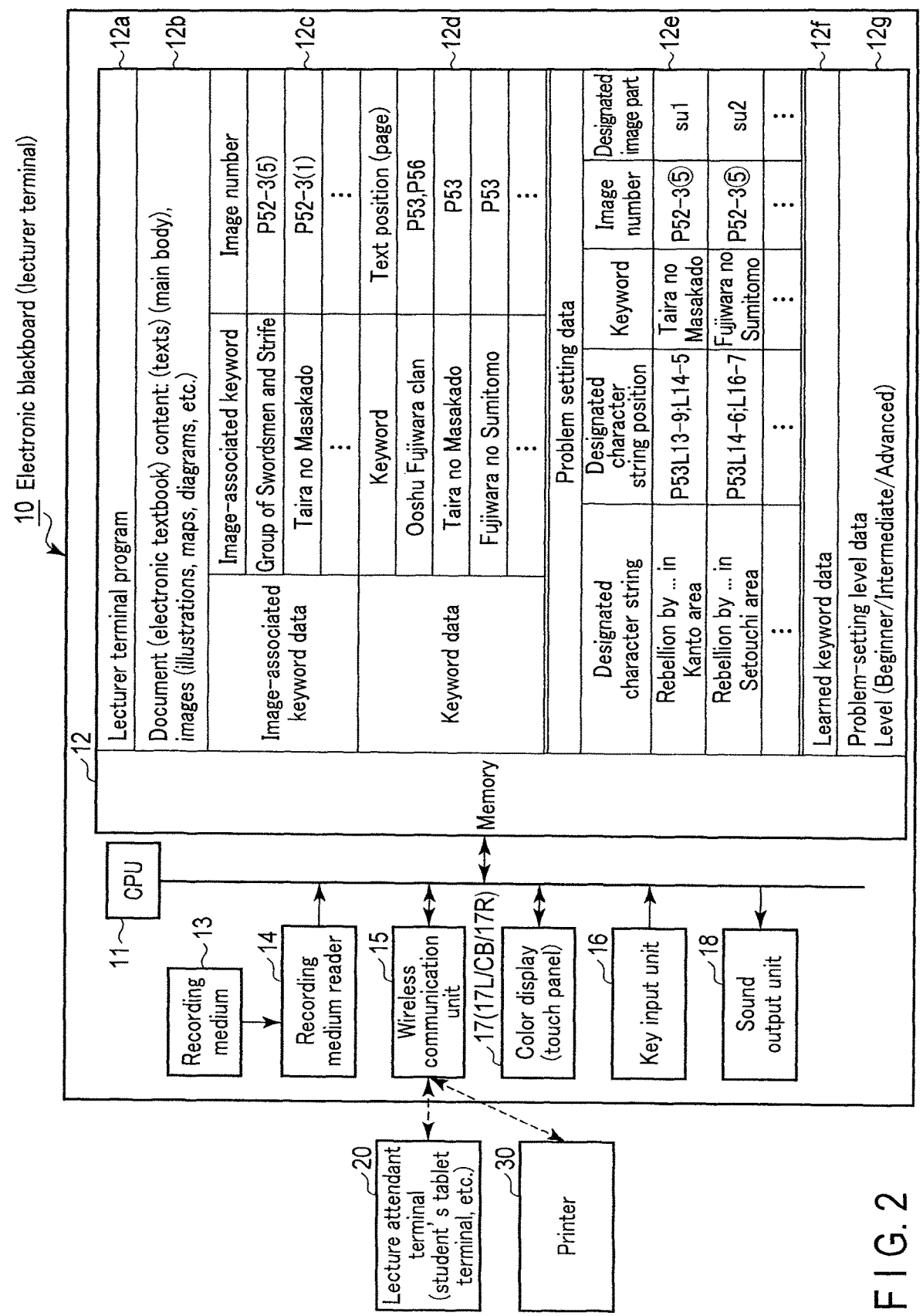
FIG. 2 is a block diagram illustrating a configuration of electronic circuitry of the electronic blackboard (lecturer terminal) 10.

FIG. 2 is a block diagram illustrating a configuration of electronic circuitry of the electronic blackboard (lecturer terminal) 10.

The electronic blackboard (lecturer terminal) 10 includes a CPU 11 which is a computer. The CPU 11 controls the operations of respective circuitry components according to a lecturer terminal program 12a which is pre-stored in a memory 12 such as a flash ROM. The lecturer terminal program 12a may be read from an external recording medium 13 such as a memory card by a recording medium reader 14 and stored in the memory 12, or may be downloaded from an external communication device (not shown) via a wireless communication unit 15 and stored in the memory 12.

The memory 12, the recording medium reader 14, and the wireless communication unit 15 are connected to the CPU 11. In addition, a key input unit 16, the touch panel-equipped color display 17 and a sound output unit 18 are connected to the CPU 11.

In the memory 12, a document (electronic textbook) content area 12b, an image-associated keyword data area 12c, a keyword data area 12d, a problem setting data area 12e, a learned keyword data area 12f, and a problem-setting level data area 12g, etc., are allocated.

In the document (electronic textbook) content area 12b, content data of various textbooks (electronic textbooks) are stored as well as text (main body) data and image (illustrations, maps, diagrams, etc.) data.

In the image-associated keyword data area 12c, a keyword of, for example, an important person or item, and an image representing the keyword that is included in each textbook (electronic textbook) stored in the document (electronic textbook) content area 12b are stored as an image-associated keyword and an image number consisting of a page and a number where the image is shown. For example, image data associated with the image-associated keyword [Group of Swordsmen and Strife] is associated with number (5) in [P52-3] of the two-page spread Tx in the data of the textbook (electronic textbook), and is arranged.

In the keyword data area 12d, a keyword that is, for example, an important person or item that is included in each textbook (electronic textbook) stored in the document (electronic textbook) content area 12b, is associated with a text position (page) in the data of the textbook (electronic textbook) which includes the keyword, and is stored. For example, the keyword [Ooshu Fujiwara clan] is included in page [P53, P56] of the data of the textbook (electronic textbook).

The following configuration may be adopted: specifically, the content data of various textbooks (electronic textbooks) stored in the document (electronic textbook) content area 12b, the data of the image-associated keywords and the image numbers stored in the image-associated keyword data area 12c, and the data of the keywords and the text positions (pages) thereof stored in the keyword data area 12d, may be downloaded and acquired from a server apparatus (a document (electronic textbook) content providing server) on a communication network (not shown) such as the Internet via a communication means such as a network communication device and wireless communication unit 15, in accordance with the necessity in connection with the operation of the electronic blackboard (lecturer terminal) 10 according to the lecturer terminal program 12a.

In the problem setting data area 12e, in the process of giving a lecture by the lecturer Le (e.g., an instructor), a character string included in the text part tp displayed on the left screen 17L is designated by a user (lecturer Le) operation, and if a keyword stored in the keyword data area 12d is included in the designated character string, the designated character string, a position of the designated character string in the data of the textbook (electronic textbook) (a designated character string position), and the keyword included in the designated character string are associated with each other, and registered and stored as problem setting data.

Figure 8:
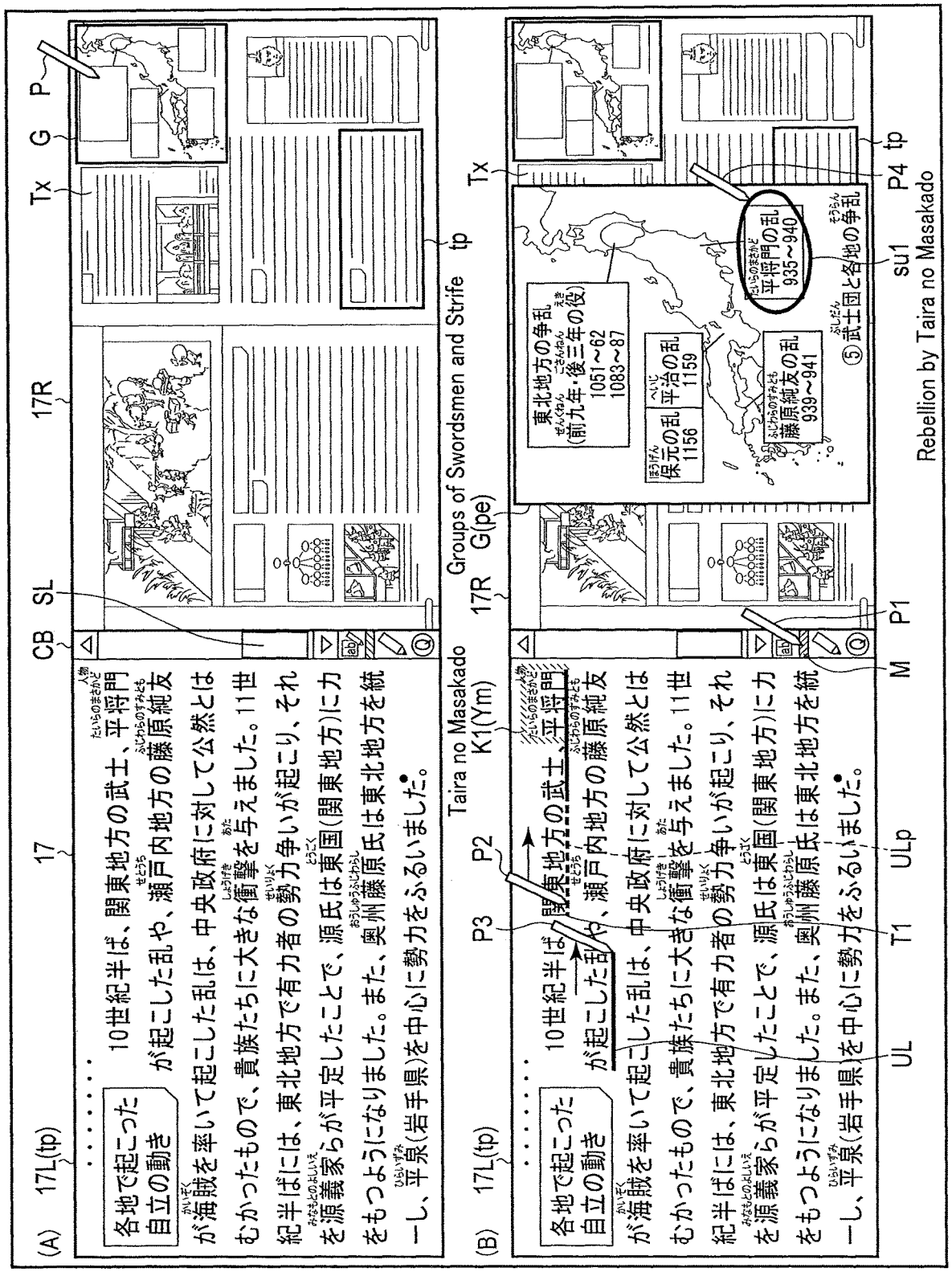
FIG. 8 is a diagram illustrating a display operation (part 1) of lecture content corresponding to a user (lecturer Le) operation according to the lecturer terminal process (part 1) of the electronic blackboard (lecturer terminal) 10.
Figure 9:
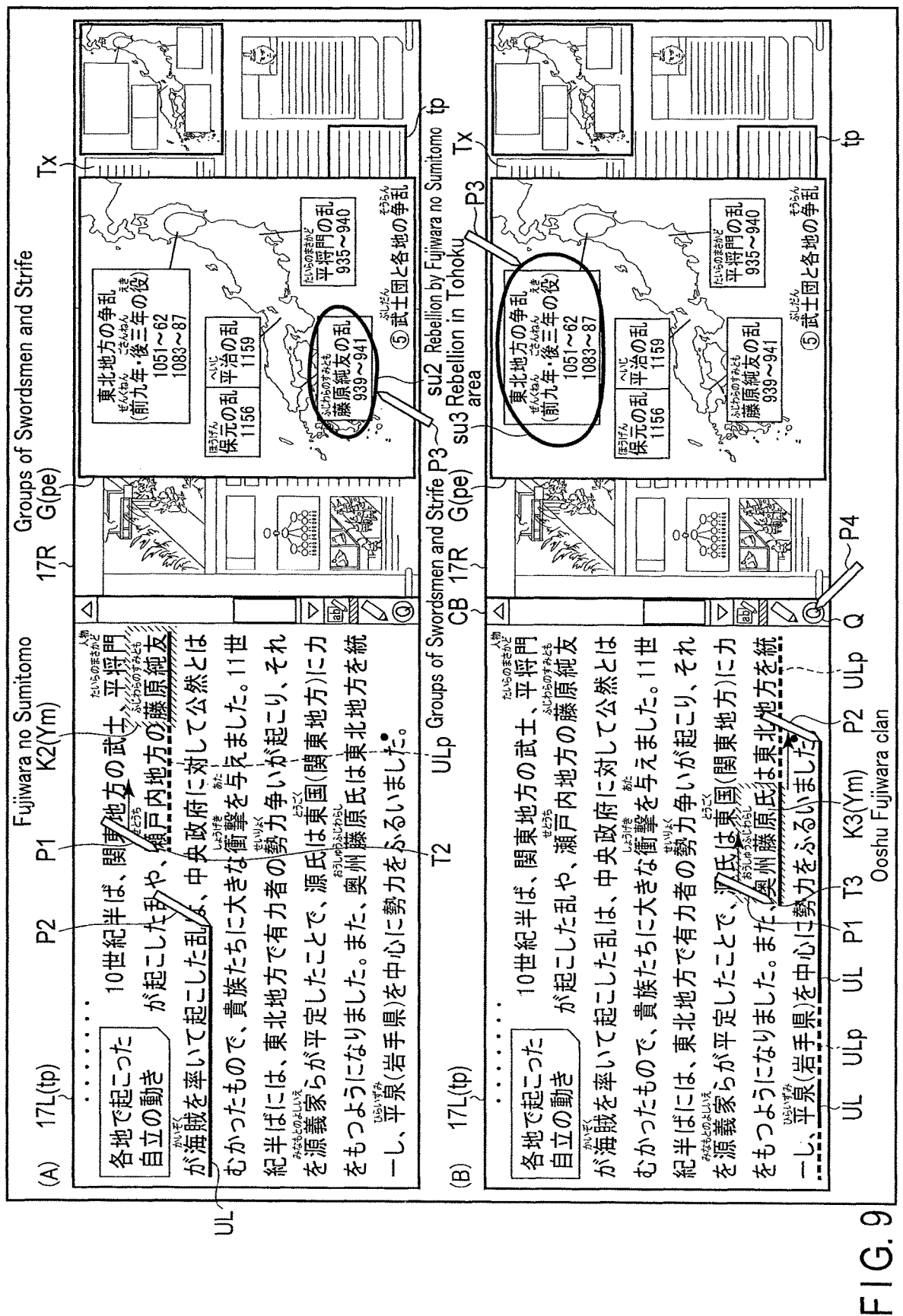
FIG. 9 is a diagram illustrating a display operation (part 2) of lecture content corresponding to a user (lecturer Le) operation according to the lecturer terminal process (part 1) of the electronic blackboard (lecturer terminal) 10.

Data of "designated character string" or "designated character string position" which is registered as the problem setting data includes data of underlines UL which are used for identifying and displaying a designated character string in accordance with a user (lecturer Le) operation (see FIGS. 8 and 9). By once again designating a part of the character string identified and displayed by the underline UL in accordance with a user operation, data of the underlines UL is changed to data of dotted underlines ULp in a part in the designated character string.

If a part of the enlarged image displayed on the right screen 17R is designated after a character string in which the keyword is included is designated in the text part tp displayed on the left screen 17L, an image number of the designated image and position information of the designated part of the image (designated image part) are additionally associated with the designated character string, the designated character string position, and the keyword, and are registered and stored in the problem setting data area 12e.

Among, the data of "designated character string", "designated character string position", and "keyword" included in the problem setting data, it is not always necessary to include the data of "designated character string" and "keyword" in the problem setting data, because they can be extracted from the data of "designated character string position" if content data of various textbooks (electronic textbook) is present in the document (electronic textbook) content area 12b and a keyword included in each textbook (electronic textbook) is present in the keyword data area 12d.

If the designated character string, the designated character string position, and the keyword are associated with each other and registered in the problem setting data area 12e in accordance with a user (lecturer Le) operation, or the image number and the designated image part are additionally associated therewith and registered in the problem setting data area 12e, the registered keyword is registered and stored in the learned keyword data area 12f as a learned keyword.

The present electronic blackboard (lecturer terminal) 10 has the following problem-setting function: a function of generating a problem screen GQ of a problem based on problem setting data registered in the problem setting data area 12e in accordance with a touch operation on the problem setting icon Q in the control box CB when data of a learned keyword is stored in the learned keyword data area 12f; a function of displaying and outputting the problem (problem-setting) on the touch panel-equipped color display 17 (17L/17M/17R); a function of transmitting and outputting the problem setting data to a lecture attendant terminal 20 (a tablet terminal or the like) of each lecture attendant St (e.g., a student) to generate a similar problem screen GQ of a problem and to display and output (problem-setting) the screen GQ to the lecture attendant terminal 20; and a function of outputting data of the problem screen GQ generated based on the problem-setting data to the printer apparatus 30 to print (problem-setting) the screen GQ.

A problem generated based on the problem-setting data is generated as a problem at any of the following problem-setting levels: (beginner), (intermediate), and (advanced). The problem-setting level is set to (beginner) by default setting, and is changed to (intermediate) or (advanced) in accordance with a user (lecturer Le) operation.

Data of a default problem-setting level or a current problem-setting level that is set in accordance with a user (lecturer Le) operation is stored in the problem-setting level data area 12g.

When the problem setting data is transmitted and output to each lecture attendant terminal 20 by the problem setting function, data of a current problem-setting level stored in the problem-setting level data area 12g is also transmitted with the problem setting data.

In the electronic blackboard (lecturer terminal) 10 with the above-described configuration, the CPU 11 controls the operations of the respective circuitry components according to the instructions described in the lecturer terminal program 12a, and the software and hardware cooperate to realize a function of generating problem setting data in line with lecture content and a function of problem setting, which will be described in the following operational description.

Figure 3:
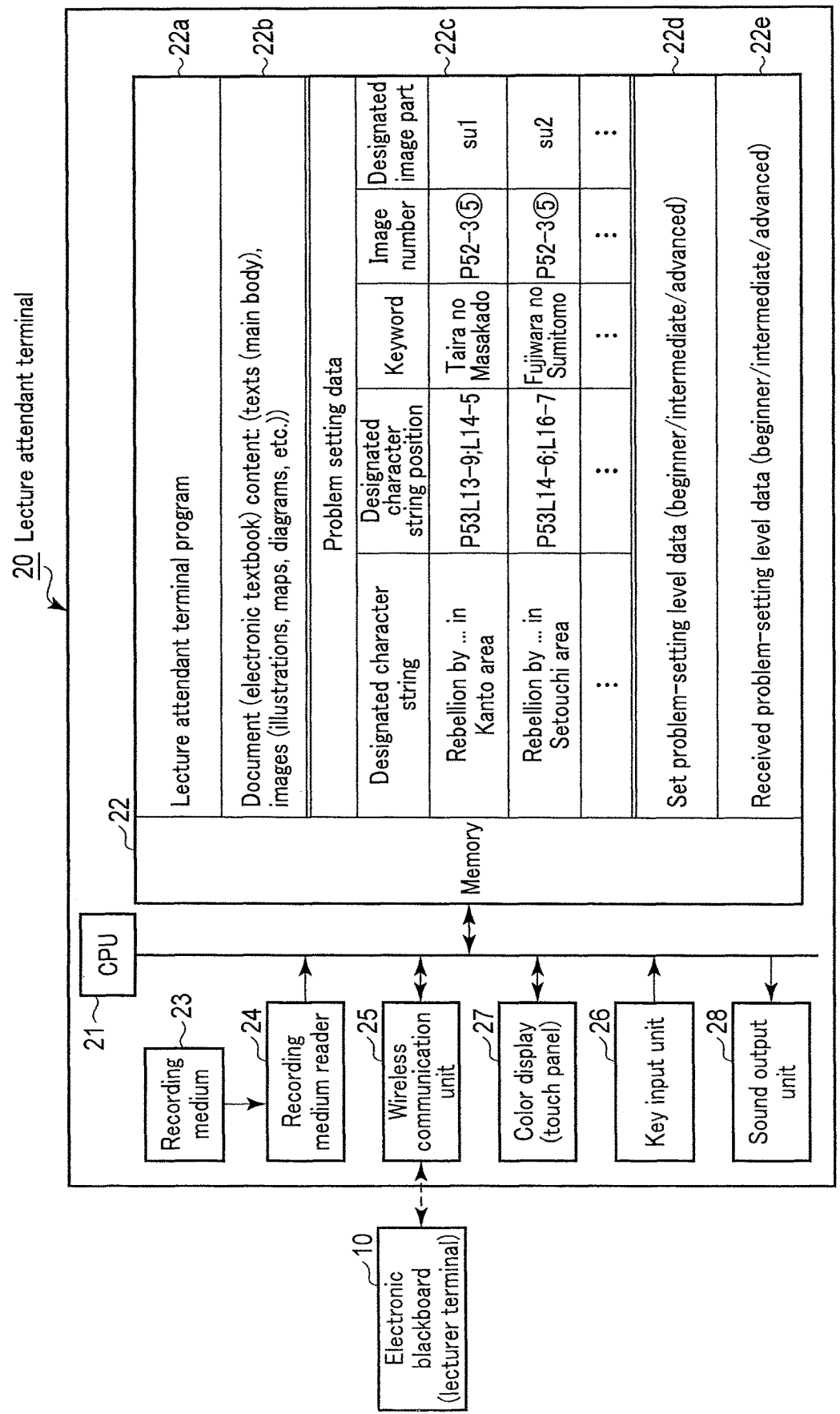
FIG. 3 is a block diagram illustrating a configuration of electronic circuitry of the lecture attendant terminal 20.

FIG. 3 is a block diagram illustrating a configuration of electronic circuitry of the lecture attendant terminal 20.

The lecture attendant terminal 20 includes a CPU 21 which is a computer. The CPU 21 controls the operations of respective circuitry components according to a lecture attendant terminal program 22a which is pre-stored in a memory 22a such as a flash ROM. The lecture attendant terminal program 22a may be read from an external recording medium 23 such as a memory card by a recording medium reader 24 and stored in the memory 22, or may be downloaded from an external communication device (not shown) via a wireless communication unit 25 and stored in the memory 22.

The memory 22, the recording medium reader 24, and the wireless communication unit 25 are connected to the CPU 21. In addition, a key input unit 26, the touch panel-equipped color display 27 and a sound output unit 28 are connected to the CPU 21.

In the memory 22, a document (electronic textbook) content area 22b, a problem setting data area 22c, a set problem-setting level data area 22d, and a received problem-setting level data area 22e are secured.

In the document (electronic textbook) content area 22b, similar to the document (electronic textbook) content area 12b of the electronic blackboard (lecturer terminal) 10, content data of various textbooks (electronic textbooks), text (main body) data, and image (illustrations, maps, diagrams, etc.) data are stored.

The lecture attendant terminal 20 may be configured to, similar to the case of the electronic blackboard (lecturer terminal) 10, download and obtain content data of each of the various textbooks (electronic textbook) stored in the document (electronic textbook) content area 22b from a server apparatus (a document (electronic textbook) content providing server) (not shown) on a communication network, such as the Internet, etc., through a communication means, such as a network communication device and a wireless communication unit 25, in accordance with a necessity of the present lecture attendant terminal 20 which operates according to the lecture attendant terminal program 22a.

In the program setting data area 22c, problem setting data composed by associating the designated character string, the designated character string position, and the keyword with each other, which are received from the electronic blackboard (lecturer terminal) 10, (or composed by further associating an image number and a designated image part therewith) is stored.

In the set problem-setting level data area 22d, data of a problem-setting level that is set in accordance with a user (lecture attendant St) operation is stored.

In the received problem-setting level data area 22e, data of program-setting level based on the setting at the electronic blackboard 10, which is received from the electronic blackboard (lecturer terminal) 10 together with the problem setting data stored in the problem setting data area 22c, is stored.

The lecture attendant terminal 20 has a text display function of selectively displaying content data of various text (electronic textbook) stored in the document (electronic textbook) content area 22b in accordance with a user (lecture attendant St) operation, and a problem setting function of generating a problem screen GQ of a problem based on the problem setting data that is received from the electronic blackboard (lecturer terminal) 10 and stored in the problem setting data area 22c and of displaying and outputting (program setting) the problem screen GQ on the touch panel-equipped color display 27.

The problem generated based on the problem setting data is generated as a problem of a difficulty level in accordance with a problem-setting level stored in the set problem-setting level data area 22d or any of the problem-setting levels stored in the received problem-setting level data area 22e (beginner/intermediate/advanced). At this time, if data of a problem-setting level is received from the electronic blackboard (lecturer terminal) 10, a problem of a problem-setting level stored in the received problem-setting level data area 22e is generated; if data of a problem-setting level is not received from the electronic blackboard (lecturer terminal) 10, a problem of a problem-setting level stored in the set problem-setting level data area 22d is generated.

In the lecture attendant terminal 20 with the above-described configuration, the CPU 21 controls the operations of the respective circuitry components according to the instructions described in the lecture attendant terminal program 22a, and the software and hardware cooperate to realize a text display function and a problem-setting function in line with lecture content, which will be described in the following operational description.

Next, the operation of an electronic lecture system with the above-described configuration will be described.

Figure 4:
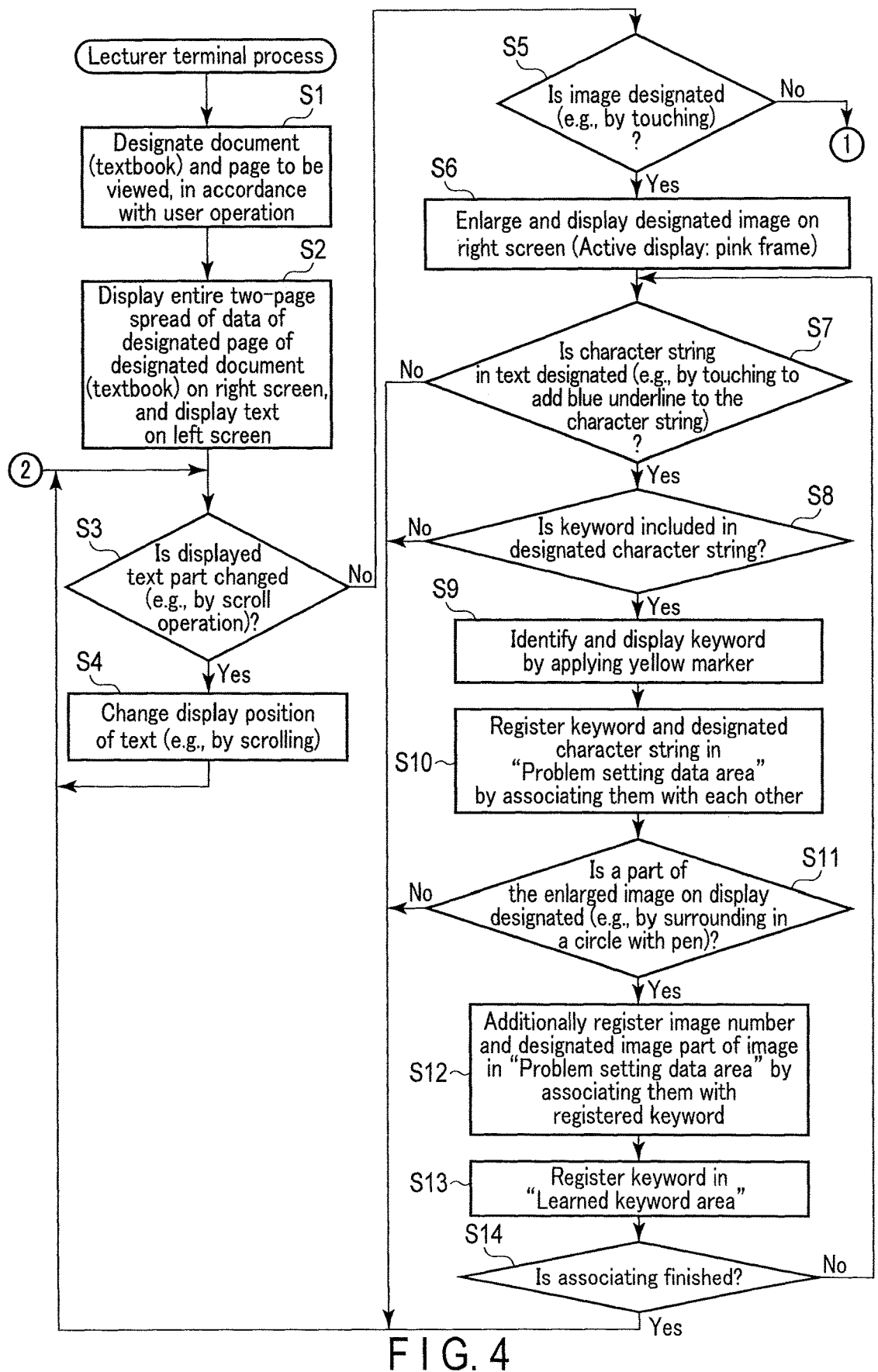
FIG. 4 is a flowchart illustrating a lecturer terminal process (part 1) of the electronic blackboard (lecturer terminal) 10.
Figure 5:
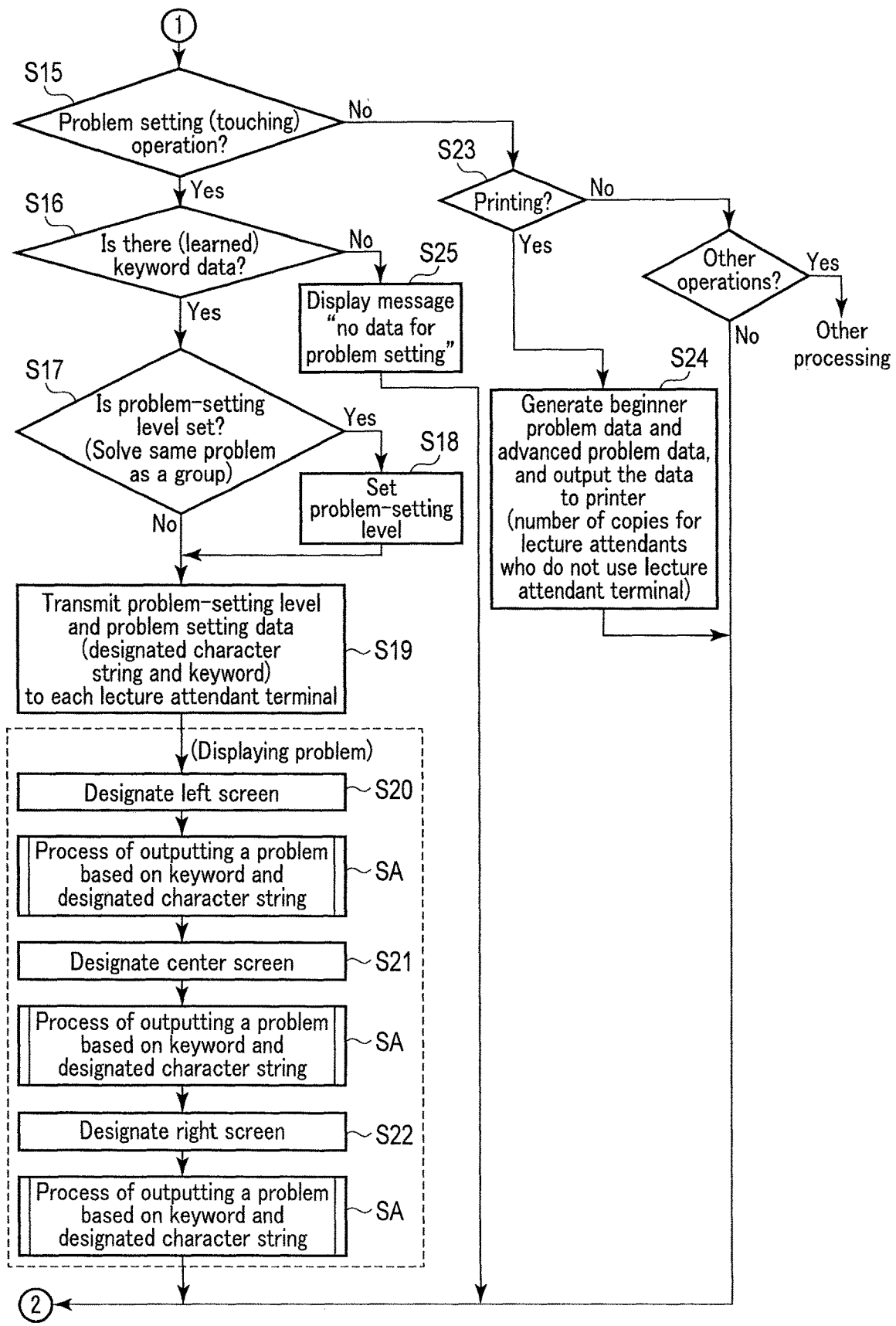
FIG. 5 is a flowchart illustrating a lecturer terminal process (part 2) of the electronic blackboard (lecturer terminal) 10.

FIG. 4 and FIG. 5 are flowcharts illustrating a lecturer terminal process (part 1 and part 2) of the electronic blackboard (lecturer terminal) 10.

Figure 6:
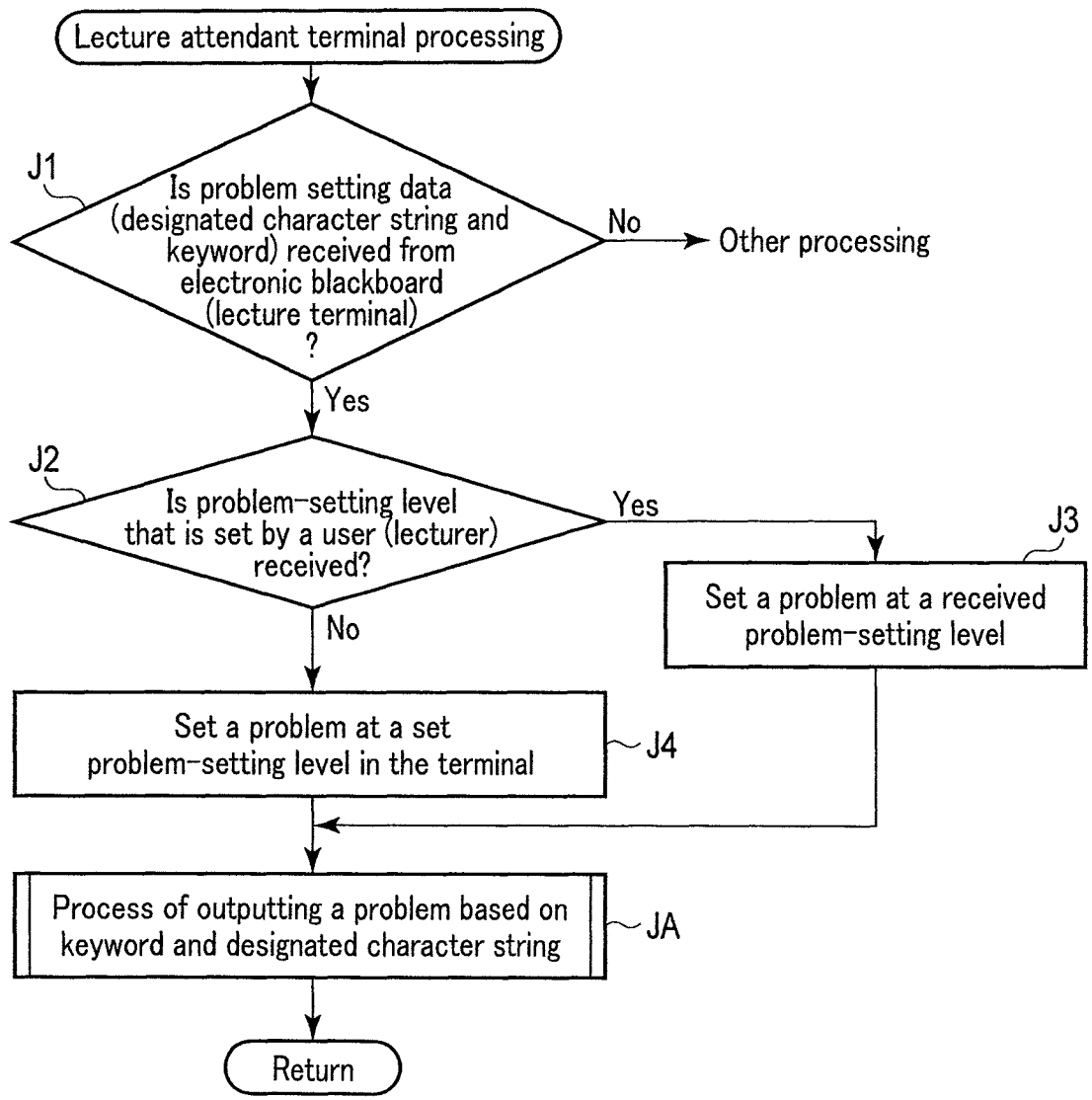
FIG. 6 is a flowchart illustrating a lecture attendant terminal process of the lecture attendant terminal 20.

FIG. 6 is a flowchart illustrating a lecture attendant terminal process of the lecture attendant terminal 20.

Figure 7:
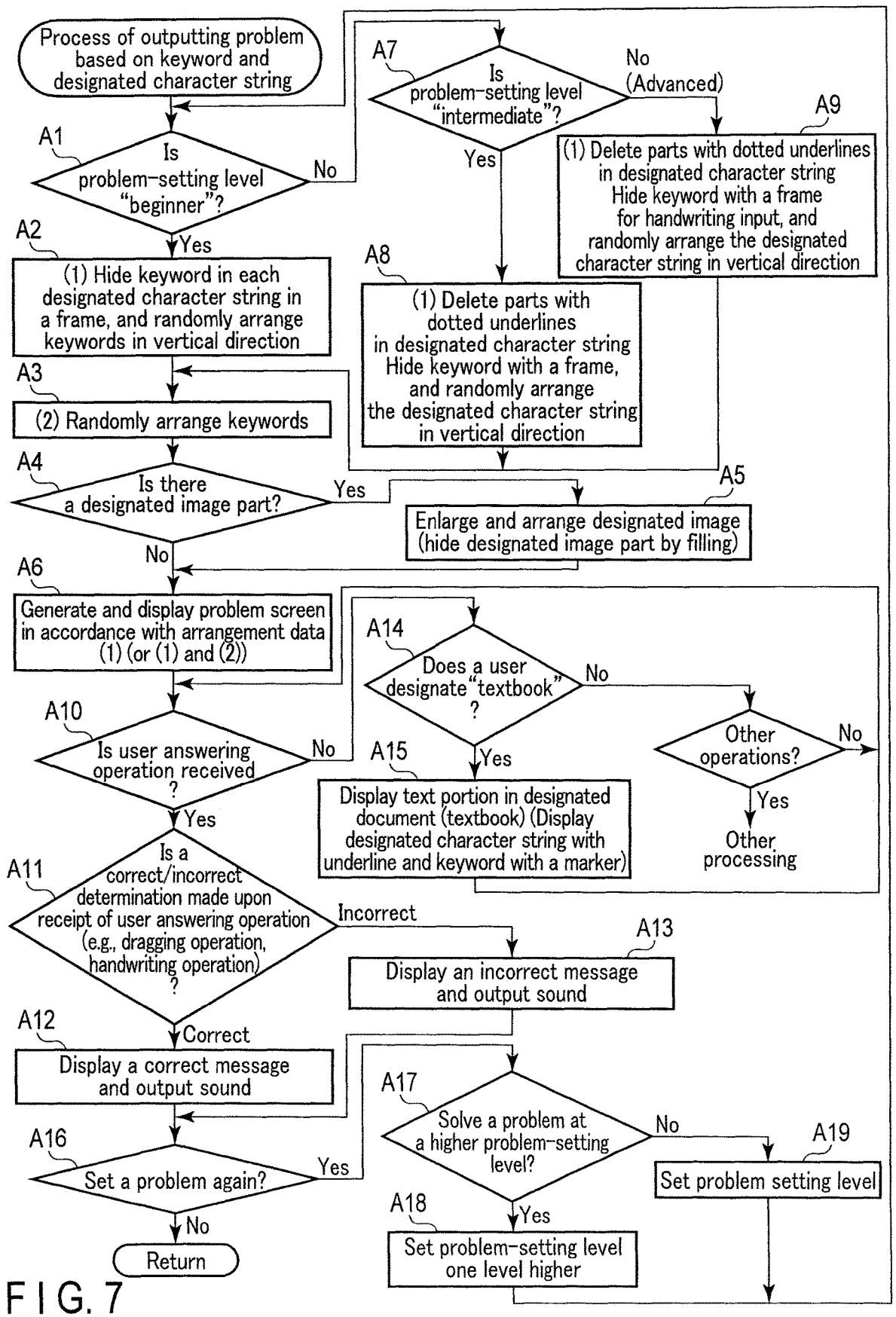
FIG. 7 is a flowchart illustrating a problem outputting process based on a keyword and a designated character string that are in common in the lecturer terminal process (part 2) of the electronic blackboard (lecturer terminal) 10 and in the lecture attendant process of the lecture attendant terminal 20.

FIG. 7 is a flowchart illustrating a problem outputting process based on a keyword a designated character string that are in common in the lecturer terminal process (part 2) of the electronic blackboard (lecturer terminal) 10 and in the lecture attendant process of the lecture attendant terminal 20.

FIG. 8 and FIG. 9 are diagrams illustrating a display operation (part 1) of lecture content corresponding to a user (lecturer Le) operation according to the lecturer terminal process (part 1 and part 2) of the electronic blackboard (lecturer terminal) 10.

First, a document (textbook) and a two-page spread Tx (P52-53 of "Junior High School History"), which are to be viewed in the present lecture, are designated in accordance with a user (lecturer Le) operation of the key input unit 16 or of the touch panel-equipped color display 17 (step S1). Then, data of the designated two-page spread Tx (P52-53) of the designated document (textbook) "Junior High School History" is read from the document (electronic textbook) content area 12b in the memory 12, and the data of the entire two-page spread Tx (P52-53) is displayed on the right screen 17R of the touch panel-equipped color display 17, as illustrated in FIG. 1 (step S2). On the left screen 17L, the beginning part of the text part tp included in the data of the entire two-page spread Tx (P52-53) is enlarged and displayed (step S2).

Then, if the lecturer Le moves the scroll icon SL in the control box CB (step S3 (Yes)), the enlarged text part tp displayed on the left screen 17L is scrolled and displayed among the data of an entire two-page spread Tx (P52-53) (step S4).

The lecturer Le thereby enlarges and displays, among the data of the two-page spread Tx (P52-53) of the document (textbook) displayed on the right screen 17R, which is a current lecture subject, the text part tp that is the focus of the lecture, on the left screen 17L, and continues the lecture, pointing out important matters with a pen P or the like (step S3, step S4).

As shown in (A) of FIG. 8, in the process of giving a lecture on the text part tp displayed on the left screen 17L as a subject, the image G of "Group of Swordsmen and Strife" included in the two-page spread Tx in the right screen 17R is touched by a pen P and designated (step S5 (Yes)).

Then, as shown in (B) of FIG. 8, the designated image [Group of Swordsmen and Strife] G is enlarged and displayed on the right screen 17R, and the display area of the image G is set to a handwriting mode, and the image G is displayed, being surrounded by a pink frame pe (step S6).

Then, after a blue marker is set by touching the marker icon M in the control box CB as indicated by the pen P1, the character string, "Rebellion by Taira no Masakado, a Swordsman in Kanto Area" T1, which is the most important part in the lecture, is touch-operated and designated in the text part tp displayed on the left screen 17L as indicated by the pen P2 and the pen P3, an underline UL in blue is added to the designated character string T1, and the character string T1 is displayed (step S7).

Then, it is determined whether any of the keywords stored in the keyword data area 12d is included in the designated character string "Rebellion by Taira no Masakado, a Swordsman in Kanto Area" T1 (step S8), and if it is determined that the keyword [Taira no Masakado] K1 is included (step S8 (Yes)), a yellow marker Ym is added to the keyword [Taira no Masakado] K1, and the keyword K1 is identified and displayed (step S9).

Herein, when the part "in Kanto Area" in the designated character string "Rebellion by Taira no Masakado, a Swordsman in Kanto Area" T1 is re-designated as indicated by the pen P2 to emphasize that Taira no Masakado as the identified and displayed keyword K1 (Ym) is a swordsman in Kanto area, the underline UL added to the re-designated part "in Kanto Area" in the character string is changed to a dotted underline ULp.

Then, data of the "Rebellion by Taira no Masakado, a Swordsman in Kanto Area" T1 (including the underline UL and the dotted underline ULp), the character string position thereof, and the keyword [Taira no Masakado] K1 are associated with each other, and registered and stored in the problem setting data area 12e in the memory 12 as problem setting data (step S10).

When the part [Rebellion by Taira no Masakado] included in the image [Group of Swordsmen and Strife] G (pe) in the right screen 17R is designated by the surrounding operation su1 as indicated by the pen P4 (step S11, (Yes)), an image number of the designated image [Group of Swordsmen and Strife] G and position information (designated image part (su1)) of the designated part [Rebellion by Taira no Masakado] in the image G are additionally associated with the designated character string "Rebellion by . . . in Kanto Area", a character string position thereof (designated characters string position), and the keyword [Taira no Masakado] K1 which are registered as the problem setting data in the problem setting data area 12e, and the image number and the position information are registered and stored in the problem setting data area 12e (step S12).

The data of the keyword [Taira no Masakado] K1 included in the problem setting data registered in the problem setting data area 12e is registered and stored in the learned keyword area 12f as a learned keyword (step S13).

When, in order to subsequently associate other character strings with a keyword for the text part tp displayed on the left screen 17L, the character string "Rebellion by Fujiwara no Sumitomo Leading Pirates in Setouchi Area" T2 is touch-operated and designated as indicated by the pen P1 and the pen P2 in (A) of FIG. 9, an underline UL is added to the designated character string T2, similar to the above, and the character string T2 is displayed (step S14 (No), then proceeds to step S7).

Then, it is determined that the keyword [Fujiwara no Sumitomo] K2 is included in the designated character string "Rebellion by . . . in Setouchi Area" T2 (step S8 (Yes)), a yellow marker Ym is added to the keyword [Fujiwara no Sumitomo] K2, and the keyword K2 is identified and displayed (step S9).

Herein also, when the part "in Setouchi Area" in the designated character string "Rebellion by . . . in Setouchi Area" T2 is re-designated to emphasize that Fujiwara no Sumitomo as the keyword K2 is a swordsman in "Setouchi Area" as indicated by the pen P1, the underlined UL added to the part [in Setouchi Area] is changed to a dotted underline ULp.

Then, similar to the above, data of the designated character string "Rebellion by . . . in Setouchi Area" T2 (including the underline UL and the dotted underline ULp), the character string position thereof, and the keyword [Fujiwara no Sumitomo] K2 are associated with each other, and registered and stored in the problem setting data area 12e as problem setting data (step S10).

When the part [Rebellion by Fujiwara no Sumitomo] included in the image [Group of Swordsmen and Strife] G (pe) in the right screen 17R is designated by the surrounding operation su2 as indicated by the pen P3 (step S11, (Yes)), an image number of the designated image [Group of Swordsmen and Strife] G and position information (designated image part (su2)) of the designated part [Rebellion by Fujiwara no Sumitomo] in the image G are additionally associated with the designated character string "Rebellion by . . . in Setouchi Area" T2, a character string position thereof (designated characters string position), and the keyword [Fujiwara no Sumitomo] K2 which are registered in the problem setting data area 12e, and registered and stored (step S12).

Then, similar to the above, the data of the keyword [Fujiwara no Sumitomo] K2 included in the problem setting data registered in the problem setting data area 12e is registered and stored in the learned keyword area 12f as a learned keyword (step S13).

Subsequently, the keyword [Ooshu Fujiwara clan] K3 is identified and displayed (Ym) and the parts "unified Tohoku area" and "(Iwate prefecture)" in the designated character T3 are re-designated (displayed in a dotted underline ULp)

by designating (applying an underline UL to) the other important character string "Ooshu Fujiwara clan . . . wielded power" T3 as indicated by the pen P1 and the pen P2 in (B) of FIG. 9. Then, similar to the above, data of the designated character string "Ooshu Fujiwara clan . . . wielded power" T3 (including the underline UL and the dotted underline ULp), the character string position thereof, and the keyword [Ooshu Fujiwara clan] K3 are associated with each other, and registered and stored in the problem setting data area 12e as problem setting data (step S7 through step S10).

When the part [Rebellion in Tohoku Area] included in the image [Group of Swordsmen and Strife] G (pe) in the right screen 17R is designated by the surrounding operation su3 as indicated by the pen P3 (step S11, (Yes)), an image number of the designated image [Group of Swordsmen and Strife] G and position information of the designated part [Rebellion in Tohoku Area] (designated image part (su3)) in the image G are additionally associated with the designated character string "Ooshu Fujiwara clan . . . wielded power" T3, the character string position thereof (designated characters string position), and the keyword [Ooshu Fujiwara clan] K3 which are registered in the problem setting data area 12e, and registered and stored (step S12).

Then, similar to the above, the data of the keyword [Ooshu Fujiwara clan] K3 included in the problem setting data registered in the problem setting data area 12e is registered and stored in the learned keyword area 12f as a learned keyword (step S13).

Figure 10:
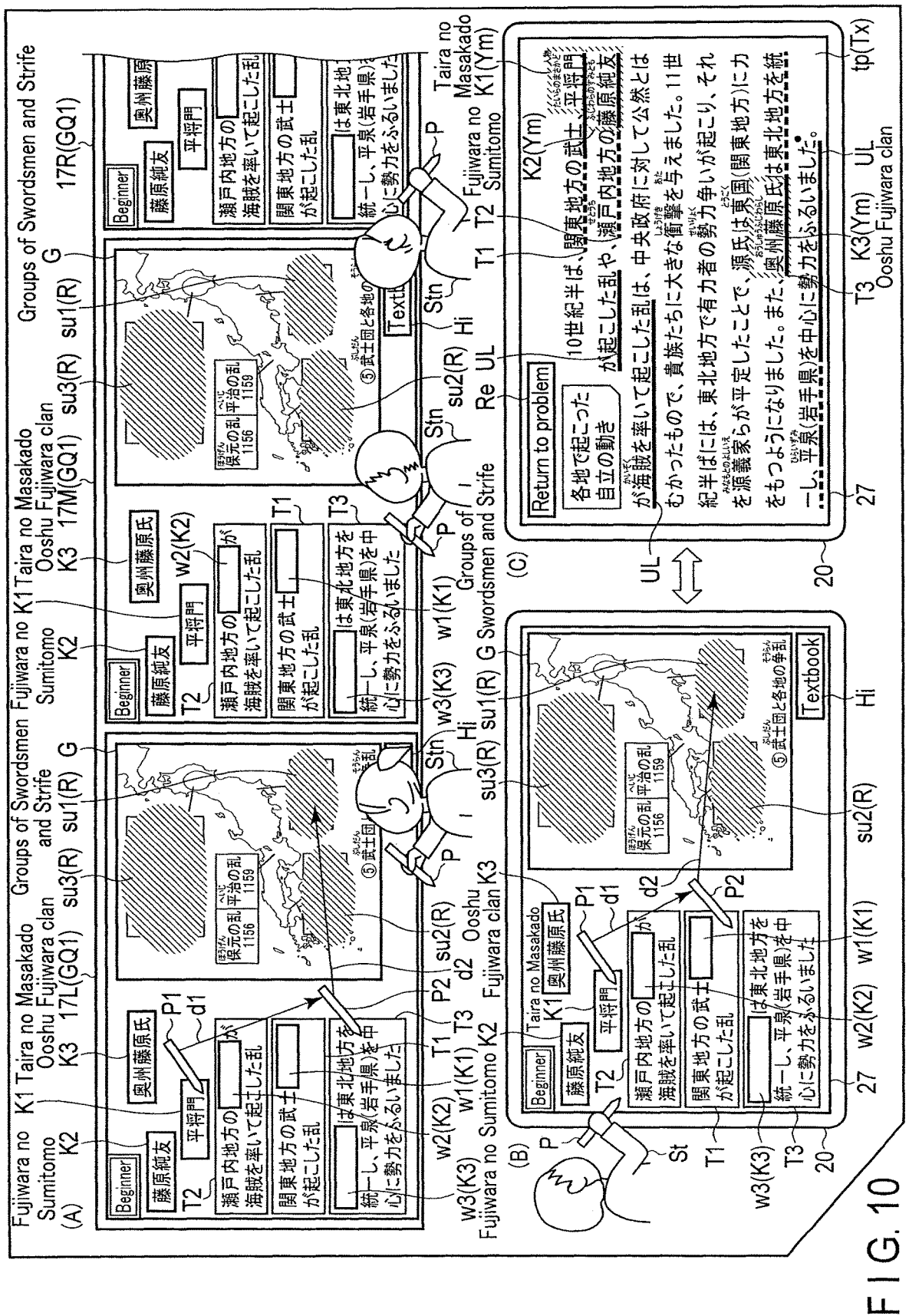
FIG. 10 is a diagram illustrating a problem outputting process in accordance with the lecturer terminal process (part 2) of the electronic blackboard (lecturer terminal) 10 and a problem outputting process in accordance with the lecture attendant process of the lecture attendant terminal 20, arranged side by side.

FIG. 10 is a diagram illustrating a problem outputting process in accordance with the lecturer terminal process (part 2) of the electronic blackboard (lecturer terminal) 10 and a problem outputting process in accordance with the lecture attendant process of the lecture attendant terminal 20, arranged side by side.

As shown in (A) of FIG. 8 through (B) of FIG. 9, the lecturer Le gives a lecture on the two-page spread Tx of the textbook (electronic textbook) which is a subject of the lecture and the text part tp thereof displayed in the touch panel-equipped display 17, pointing out important character strings T1 to T3 including the keywords K1 to K3 and parts (su1 to su3) of the image G. When the problem setting icon Q in the control box CB is touch-operated by the pen P as shown in (B) of FIG. 9 (step S15 (Yes)), it is determined whether or not a learned keyword is registered in the learned keyword data area 12f (step S16).

Herein, it is determined that three keywords successively registered in step S13 ([Taira no Masakado] K1/[Fujiwara no Sumitomo] K2/[Ooshu Fujiwara clan] K3) are registered as learned keywords in the learned keyword data area 12f (step S16 (Yes)).

Then, a message that asks the user (lecturer Le) to select whether a problem-setting level of a problem is to be set or not, "Set problem-setting level [Yes] or [No]?", is displayed on the left screen 17L, and if [Yes (Set problem-setting level)] is touch-operated and selected in accordance with the message (step S17 (Yes)), a problem-setting level setting screen (not shown) for setting a problem-setting level to any one of (beginner), (intermediate), and (advanced) is displayed on the left screen 17L instead of the message (step S18).

Then, when the problem-setting level is set to any of (beginner), (intermediate), and (advanced) in accordance with a user (lecturer Le) operation according to the problem-setting level setting screen and stored in the problem-setting level data area 12g, data of the set problem-setting level (including information set by a user (lecturer Le)), and problem setting data (designated character string (Tn)/designated character string position/keyword (Kn)/image number/designated image part (sun)) including each learned keyword registered in the problem setting data area 12e ([Taira no Masakado] K1, [Fujiwara no Sumitomo] K2, [Ooshu Fujiwara clan] K3) are transmitted (delivered) to each lecture attendant terminal 20 (step S19). The symbol "n" in each of Tn, Kn, and sun is a natural number.

In step S17, when [No (Not set a problem-setting level)] is touch-operated and selected (step S17 (No)), data of the problem-setting level (beginner) (not including information set by a user (lecturer Le)) stored in the problem-setting level data area 12g by default setting is transmitted (delivered) to each lecture attendant terminal 20 with the problem setting data registered in the problem-setting data area 12e (step S19).

Then, as shown in (A) of FIG. 10, the left screen 17L, the center screen 17M, and the right screen 17R of the touch panel-equipped display 17 are subsequently designated in the present electronic blackboard (lecturer terminal) 10 (step S20, step S21, and step S22), and a process of outputting a problem based on a keyword and a designated character string as shown in FIG. 7 is performed for each of the designated left screen 17L, center screen 17M, and right screen 17R, and a problem screen GQn generated based on the problem-setting level and the problem setting data is displayed (step SA).

In (A) of FIG. 10, the problem screen GQ1 of a problem at the problem-setting level (beginner) is generated and displayed in each of the left screen 17L, the center screen 17M, and the right screen 17R.

At this time, the display data of the text part tp in the lecture displayed on the left screen 17L (including data of the keywords K1 (Ym) to K3 (Ym) of the designated character strings T1 to T3, the underline UL, and the dotted underline ULp), as shown in (B) of FIG. 8 through (B) of FIG. 9, is temporarily evacuated and saved in a text evacuation area (not shown) in the memory 12.

On the other hand, when the data of the problem-setting level and the problem setting data (designated character string (Tn)/designated character string position/keyword (Kn)/image number/designated image part (sun)) transmitted (delivered) from the electronic blackboard (lecturer terminal) 10 are received in each lecture attendant terminal 20 (step J1 (Yes)), it is determined whether or not the data of the problem-setting level including information set by the user (lecturer Le) is received (step J2).

Herein, if it is determined that the received data of the problem-setting level includes information set by the user (lecturer Le) (step J2 (Yes)), after the received data of the problem is stored in the received problem-setting level data area 22e and a problem-setting level of a problem is set (step J3), a process of outputting a problem based on a keyword and a designated character string as described in FIG. 7 is performed, and a problem screen GQn generated based on the problem-setting level and the problem setting data set by the user (lecturer Le) is displayed as shown in (B) of FIG. 10 (step JA).

If it is determined that the received problem-setting level data does not include information set by the user (lecturer Le) (step J2 (No)), after the problem-setting level stored in the set problem-level data area 22d is set as a problem-setting level of a problem in accordance with an operation of a user (lecture attendant St) of the present lecture attendant terminal 20 (step J4), a process of outputting a problem based on a keyword and a designated character string as shown in FIG. 7 is performed, and a problem screen GQn generated based on the problem-setting level set by the user (lecture attendant St) and the problem setting data is displayed as shown in (B) of FIG. 10 (step JA).

In (B) of FIG. 10, the problem screen GQ1 showing a problem at a problem-setting level (beginner) is generated and displayed.

At this time, similar to the electronic blackboard (lecturer terminal) 10, the display data (including data of the keywords K1 (Ym) to K3 (Ym) of the designated character strings T1 to T3, the underline UL, and the dotted underline ULp) of the text part tp for which the lecture is given and which is displayed on the touch panel-equipped display 27 until immediately before this time is temporarily evacuated and saved in a text evacuation area (not shown) in the memory 22.

In other words, if the problem-setting level is set to (beginner) in the process of outputting a problem based on a keyword and a designated character string as shown in FIG. 7 (step A1 (Yes)), for the designated character strings included in the problem setting data (designated character string (Tn)/designated character string position/keyword (Kn)/image number/designated image part (sun)), i.e., "Rebellion by . . . in Kanto area" T1, "Rebellion by . . . in Setouchi area" T2, and "Ooshu Fujiwara clan wielded power" T3, the keywords [Taira no Masakado] K1, [Fujiwara no Sumitomo] K2, [Ooshu Fujiwara clan] K3 are hidden by the frames w1, w2, w3, and randomly arranged in a vertical direction in a screen as a display target, and beginner-level arrangement data (1) and (2) are generated for randomly arranging the keywords [Taira no Masakado] K1, [Fujiwara no Sumitomo] K2, [Ooshu Fujiwara clan] K3 in the same screen (step A2 and step A3).

Then, if an image number and a designated image part (sun) are included in the problem setting data (step A4 (Yes)), arrangement data for arranging in a screen as a display target the image [Group of Swordsmen and Strife] G corresponding to the image number is generated, while hiding the designated image parts (su1), (su2) (su3) by filling (step A5).

Then, for the electronic blackboard (lecturer terminal) 10, the beginner-level problem screen GQ1 generated in accordance with the arrangement data (1) and (2) for the beginner-level problem and the arrangement data for the image G is displayed in the left screen 17L, the center screen 17M, and the right screen 17R of the touch panel-equipped display 17 side by side, as shown in (A) of FIG. 10; for the lecture attendant terminal 20, the screen GQ1 is shown in the touch panel-equipped display 27 as shown in (B) of FIG. 10 (step A6).

In the beginner-level problem screen GQ1, by an operation of a user (e.g., a lecture attendant Stn in the electronic blackboard 10, or a lecture attendant St in the lecture attendant terminal 20), as indicated by the pen P1 and the pen P2, each keyword displayed in the same screen GQ1, i.e., [Taira no Masakado] K1, [Fujiwara no Sumitomo] K2, or [Ooshu Fujiwara clan] K3, is selectively dragged as indicated by arrows d1 and d2, and fitted into frames w1(K1), w2(K2), w3(K3) hiding the character strings T1, T2, and T3 and the designated image parts (su1), (su2), (su3) being hidden on the image G, thereby answering the problem (step A10 (Yes)).

Then, a determination regarding whether the answer is correct or not is made by determining whether the dragged keyword Kn matches any of the keywords [Taira no Masakado] K1, [Fujiwara no Sumitomo] K2, and [Ooshu Fujiwara clan] K3 that are respectively associated with the designated character strings T1, T2, and T3 as destinations of the drag d1, and that are included in the problem setting data, and whether the dragged keyword Kn matches any of the keywords [Taira no Masakado] K1, [Fujiwara no Sumitomo] K2, and [Ooshu Fujiwara clan] K3 that are respectively associated with the designated image parts (su1), (su2), and (su3) as destinations of the drag d2, and that are included in the problem setting data (step A11).

For example, if the keyword [Taira no Masakado] K1 in the beginner-level problem screen GQ1 is subsequently dragged as indicated by arrows d1 and d2 and fitted into the frame w1 (K1) for the designated character string T1 in the same screen GQ1 and into the designated image part (su1) of the image G, a message indicating the problem is correctly answered, "It's correct", is displayed, and a chime-like sound is output from the sound output unit 18 (step A11 (Correct), then proceeds to A12).

On the other hand, for example, if the keyword [Fujiwara no Sumitomo] K2 in the beginner-level problem screen GQ1 is subsequently dragged as indicated by arrows d1 and d2 and fitted into the frame w1 (K1) for the designated character string T1 in the same screen GQ1 and into the designated image part (su1) of the image G, a message indicating the problem is incorrectly answered, "It's incorrect", is displayed, and a buzzer sound is output from the sound output unit 18 (step A11 (Incorrect), then proceeds to A13).

If the problem-setting level is set to (intermediate) in the process of outputting a problem based on the keyword and the designated character string (FIG. 7) (step A7 (Yes)), for the designated character strings included in the problem setting data (designated character string (Tn)/designated character string position/keyword (Kn)/image number/designated image part (sun)), i.e., "Rebellion by . . . in Kanto area" T1, "Rebellion by . . . in Setouchi area" T2, and "Ooshu Fujiwara clan wielded power" T3, the dotted-underlined ULp portions that can be hints for a problem (e.g., "in Kanto area" in T1, "in Setouchi area" in T2, "unified Tohoku area" and "(Iwate prefecture)" in T3) are deleted and changed to character strings T1', T2', and T3'. Then, the keywords [Taira no Masakado] K1, [Fujiwara no Sumitomo] K2, [Ooshu Fujiwara clan] K3 are hidden by the frames w1, w2, w3, and randomly arranged in a vertical direction in a screen as a display target, and intermediate-level arrangement data (1) and (2) are generated for randomly arranging the keywords [Taira no Masakado] K1, [Fujiwara no Sumitomo] K2, [Ooshu Fujiwara clan] K3 in the same screen (step A8 and step A3).

Then, similar to the above, if an image number and a designated image part (sun) are included in the problem setting data (step A4 (Yes)), arrangement data for arranging in a screen as a display target the image [Group of Swordsmen and Strife] G corresponding to the image number is generated, while hiding the designated image parts (su1), (su2) (su3) by filling (step A5).

Then, for the electronic blackboard (lecturer terminal) 10, the intermediate-level problem screen GQ2 (see the center screen 17M in (A) of FIG. 11) generated in accordance with the arrangement data (1) and (2) for the intermediate-level problem and the arrangement data for the image G is displayed in the left screen 17L, the center screen 17M, and the right screen 17R of the touch panel-equipped display 17 side by side; for the lecture attendant terminal 20, the screen GQ2 is shown in the touch panel-equipped display 27 (step A6).

Since how a user (a lecture attendant Stn or St) answers a problem and how the answer is determined to be correct or incorrect on the intermediate-level problem screen GQ2 are the same as those on the beginner-level problem screen GQ1, the explanation thereof is omitted. The intermediate-level problem screen GQ2 is different from the beginner-level problem screen GQ1 in that the dotted-underlined portions that can be hints for a problem are deleted in each designated character T1', T2' or T3' to make the problem difficult.

If the problem-setting level is set to (advanced) in the process of outputting a problem based on the keyword and the designated character string (FIG. 7) (step A7 (No)), for the designated character strings included in the problem setting data (designated character string (Tn)/designated character string position/keyword (Kn)/image number/designated image part (sun)), i.e., "Rebellion by . . . in Kanto area" T1, "Rebellion by . . . in Setouchi area" T2, and "Ooshu Fujiwara clan wielded power" T3, the dotted-underlined ULp portions that can be hints for a problem (e.g., "in Kanto area" in T1, "in Setouchi area" in T2, "unified Tohoku area" and "(Iwate prefecture)" in T3) are deleted and changed to character strings T1', T2', and T3'. Then, the keywords [Taira no Masakado] K1, [Fujiwara no Sumitomo] K2, [Ooshu Fujiwara clan] K3 are hidden by the frames wh1, wh2, wh3, and randomly arranged in a vertical direction in a screen as a display target, and advanced-level arrangement data (1) is generated for randomly arranging the keywords in the screen which is a display target (step A9).

Then, similar to the above, if an image number and a designated image part (sun) are included in the problem setting data (step A4 (Yes)), arrangement data for arranging in a screen as a display target the image [Group of Swordsmen and Strife] G corresponding to the image number is generated, while hiding the designated image parts (su1), (su2), (su3) by filling (step A5).

Then, for the electronic blackboard (lecturer terminal) 10, the advanced-level problem screen GQ3 (see (B) of FIG. 11) generated in accordance with the arrangement data (1) for the advanced-level problem and the arrangement data for the image G is displayed in the left screen 17L, the center screen 17M, and the right screen 17R of the touch panel-equipped display 17 side by side, and for the lecture attendant terminal 20, the screen GQ3 is shown in the touch panel-equipped display 27 (step A6).

In the advanced-level problem screen GQ3, by a user (a lecture attendant Stn on the electronic blackboard 10, a lecture attendant St on the lecture attendant terminal 20) operation, a character string (keyword) that is hidden in each of the designated character strings T1', T2', and T3' and the user thinks correct is input by handwriting with a pen P to each of the frame wh1(K1), wh2(K2), wh3(K3) for inputting by handwriting, and the designated character strings T1', T2', and T3' are selectively dragged to and fitted into the designated image parts (su1), (su2), (su3) hidden on the image G, thereby answering a problem (step A10 (Yes)).

Then, whether the answer is correct or incorrect is determined by determining whether the character strings (keywords) that are input by handwriting into the frames wh1 (K1), wh2(K2), and wh3(K3) for handwritten input in the designated character strings T1', T2' and T3', and that are recognized by character recognition match the keywords [Taira no Masakado] K1, [Fujiwara no Sumitomo] K2, and [Ooshu Fujiwara clan] K3 that are associated with the designated character strings T1', T2' and T3' and that are included in the problem setting data, and by determining whether the character strings (keywords) match the keywords [Taira no Masakado] K1, [Fujiwara no Sumitomo] K2, and [Ooshu Fujiwara clan] K3 that are associated with the designated image parts (su1), (su2), (su3) that are destinations of the dragged designated character strings T1', T2' and T3', and that are included in the problem setting data (step A11).

For example, if a handwritten character string [Fujiwara no Sumitomo] is input to the frame wh2(K2) for inputting by handwriting for the designated character string T2' in the advanced-level problem screen GQ3, and the designated character string T2' is dragged and fitted into the designated image part (su2) in the image G, the message indicating the problem is correctly answered, "It's correct", is displayed, and a chime-like sound is output from the sound output unit 18 (step A11 (Correct), then proceeds to step A12).

On the other hand, for example, if a handwritten character string [Fujiwara no Sumitomo] is input to the frame wh2 (K2) for inputting by handwriting for the designated character string T2' in the advanced-level problem screen GQ3, but the designated character string T2' is dragged and fitted into the designated image part (su1) in the image G, the message indicating the problem is incorrectly answered, "It's incorrect", is displayed, and a buzzer sound is output from the sound output unit 18 (step A11 (Incorrect), then proceeds to step A13).

A [Textbook] key Hi is added to each problem screen GQn that is generated and displayed in accordance with the problem outputting process (FIG. 7) to recall and display display data of a text part tp for which a lecture is currently being given and that is evacuated and stored in the text evacuation area (not shown) in accordance with a user (lecture attendant St) operation, as shown in (B) of FIG. 10.

Then, for example, as shown in (B) of FIG. 10, if the [Textbook] key Hi added to the present problem screen GQ1 is touch-operated and designated (step A14 (Yes)) in the middle of the answering operation while the beginner-level problem screen GQ1 is being displayed, the display data of the text part tp for which a lecture is currently being given that is recalled from the text evacuation area (not shown) in the memory 12 (or 22) (including the yellow markers Ym, the underlines UL, and the dotted underlines ULp applied to the keywords K1 to K3 in the designated character strings T1 to T3) is displayed again as shown in (C) of FIG. 10 to be referred to as hints for the problem (step A15).

At this time, a [Return to Problem] key Re is added to the display screen re-displaying the text part tp for which a lecture is currently being given in accordance with an operation of the [Textbook] key Hi.

Then, when a certain length of time (e.g., five seconds) elapses after the text part tp for which the lecture is currently being given is re-displayed, or when the [Return to Problem] key Re is touch-operated and designated, the display is returned to the beginner-level problem screen GQ1 in which an answering operation was completed halfway through, as shown in (B) of FIG. 10 (step A10).

Thus, in the electronic blackboard (lecturer terminal) 10, a process of outputting a correct/incorrect determination is performed according to a lecture attendant Stn answering operation in accordance with the problem screen GQn of a problem-setting level that is set by default or by a user (lecturer Le) operation, or in the lecture attendant terminal 20, a process of outputting a correct/incorrect determination is performed according to a lecture attendant St answering operation in accordance with the problem screen GQn of a problem-setting level that is received from the blackboard (lecturer terminal) 10 or set by a user (lecture attendant St) operation (step A1 to step A13). Then, when resetting of a problem is designated by a user operation (step A16 (Yes)), a problem-setting level is set higher than a currently-set problem-setting level, or a problem setting select message that asks a user to set a problem-setting level at a user's preference, "Do you want to try problems at higher level?", is displayed (step A17).

If "Try problems at higher level [Yes]" is selected in accordance with the problem-setting level select message (step A17 (Yes)), a problem-setting level is set one level higher than the currently-set problem-setting level (step A18), and the problem outputting process is repeated from step A1.

On the other hand, if "Try problems at higher level [No]" is selected in accordance with the problem-setting level select message (step A17 (No)), a problem-setting level is set as appropriate in accordance with a user operation (step A19), and the problem outputting process is repeated from step A1.

In the electronic blackboard (lecturer terminal) 10, similar to the above, a lecturer Le has been giving a lecture, pointing out the important character strings T1 to T3 including the keywords K1 to K3 and the parts of the image G (su1 to su3) in the two-page spread Tx of a text (electronic textbook) which is a subject of the lecture and displayed on the touch panel-equipped display 17 and the text part tp thereof (see (A) of FIG. 8 through (B) of FIG. 9). Herein, when printing is instructed in accordance with a user (lecture Le) operation (step S23 (Yes)), data of the beginner-level problem screen GQ1 and data of the advanced-level problem screen GQ3, which are generated in accordance with the problem outputting processing (see FIG. 7) similar to the above, are transmitted and output to the printing apparatus 30 through the wireless communication unit 15, and a problem displayed on the beginner-level problem screen GQ1 and a problem displayed on the advanced-level problem screen GQ3 are printed out for a number of the lecture attendants Stn who do not use the lecture attendant terminal 20 (step S24).

When the problem-setting button Q displayed in the control box CB is touch-operated (step S15 (Yes)), if it is determined that there is no data of learned keywords registered in the learned keyword data area 12f (step S16 (No)), a message "No data for problem setting" is displayed (step S25).

FIG. 11 is a diagram illustrating another embodiment of a problem outputting process in accordance with the lecturer terminal process (part 2) of the electronic blackboard (lecturer terminal) 10 and a problem outputting process in accordance with the lecture attendant process of the lecture attendant terminal 20.

As shown in FIG. 11, the problem-setting level of each problem screen GQn to be displayed in each of the left screen 17L, the center screen 17M, and the right screen 17R in accordance with the lecture terminal processing in the electronic blackboard (lecturer terminal) 10 (step S20 (SA) through step S22 (SA)), and the problem setting level to be displayed in accordance with the lecture attendant terminal processing in the lecture attendant terminal 20 (step JA) may be set at different problem-setting levels, depending on a lecture attendant St (Stn) who answers a problem, for example.

Thus, according to the electronic lecture system configured as described above, a user (lecturer Le) of the electronic blackboard (lecturer terminal) 10 enlarges and displays a text part tp which is a focus of a current lecture on the left screen 17L from the two-page spread Tx of a document (textbook) which is a subject of the current lecture displayed on the right screen 17R, and gives the lecture, pointing out important matters with a pen P, etc. In the process, the user only has to designate a character string Tn that includes an important keyword Kn and displays an underline UL to emphasize the character string Tn in order to automatically generate problem setting data for associating a keyword Kn with the designated character string Tn in line with lecture content, and to generate a problem screen GQ in accordance with the problem setting data, and to display and output the problem screen on a plurality of screens 17L, 17M, and 17R, side by side. It is also possible to transmit and output the problem setting data to the lecture attendant terminal 20, and generate and display a problem screen GQ in accordance with the problem setting data on the lecture attendant terminal 20. Furthermore, a lecture attendant Stn who does not use the lecture attendant terminal 20 can perform an answering operation for each problem setting screen GQ displayed on the electronic blackboard (lecturer terminal) 10, and a lecture attendant St who uses the lecture attendant terminal 20 can perform an answering operation for a problem screen GQ displayed on the terminal 20.

It is thereby possible for both of a lecture attendant St who uses a lecture attendant terminal 20 and a lecture attendant Stn who does not use a terminal 20 to carry out timely learning in line with content of a lecture about a designated character string Tn that includes an important keyword Kn designated by the lecturer Le.

In the electronic blackboard (lecturer terminal) 10, after designating a character string Tn that includes an important keyword Kn and displaying an underline UL, an image G included in the two-page spread Tx is designated, enlarged and displayed, and a part (sun) in the image G corresponding to the keyword Kn is designated and emphasized. It is thereby possible to automatically generate problem setting data for associating the designated image part sun with the keyword, in addition to associating the designated character string Tn with the keyword Kn in line with the lecture content.

In the electronic blackboard (lecturer terminal) 10, after designating a character string Tn that includes the important keyword Kn and displaying an underline UL thereto, a part in the character string Tn is re-designated, and the underline UL is changed to a dotted underline ULp for emphasis. Then, the problem setting data is generated, with the dotted underline ULp indicating the re-designated part being added to the data of the designated character string Tn. Then, if the problem-setting level is set to (beginner), a beginner-level problem screen GQ1 in which a keyword Kn and a designated character Tn are associated with each other is generated, and if the problem-setting level is set to (intermediate), an intermediate-level problem screen GQ2 in which a keyword Kn and a designated character string Tn' from which the re-designated portion is excluded are associated with each other is generated. It is thereby possible to generate a beginner-level problem screen GQ1 that includes a part (ULp) that may provide a hint for a keyword Kn in the designated character string Tn, and to generate an intermediate-level problem screen GQ2 that does not include such a part (ULp).

In the above embodiment, it is explained that an operation of designating various data displayed on a touch panel-equipped display 17 (27) is performed in both of the electronic blackboard (lecturer terminal) 10 and the lecture attendant terminal 20 through a user touch-operation; however, such a designating operation may be performed by moving a cursor in the display or by operating a mouse.

The lecture attendant terminal (tablet terminal or the like) 20, which each lecture attendant St has, may be configured to have the same function as the electronic blackboard (lecturer terminal) 10. Thereby, each lecture attendant St can operate the lecture attendant terminal 20 in the same manner as the lecturer Le (e.g., an instructor) operates the electronic blackboard 10 during the lecture. Thus, similar to the above, in each lecture attendant terminal 20 itself, problem setting data can be generated and registered, and a problem setting screen GQ can be generated to set a problem based on the problem setting data, and each lecture attendant St can carry out timely learning in accordance with the content of the lecture given by a lecturer Le (e.g., an instructor).

Each processing procedure adopted in the electronic lecture system according to each of the above-described embodiments, that is, lecturer terminal processing (part 1 and part 2) by the electronic blackboard (lecturer terminal) 10 shown in the flowcharts of FIGS. 4 and 5, lecture attendant terminal processing by the lecture attendant terminal 20 shown in the flowchart of FIG. 6, and problem outputting processing based on a keyword and a designated character string that are in common in the lecture terminal processing (part 2) of the electronic blackboard (lecturer terminal) 10 shown in the flowchart of FIG. 7 and in the lecture attendant terminal processing of the lecture attendant terminal 20, maybe stored in a recording medium, such as a memory card (an ROM card, an RAM card, etc.), a magnetic disc (a floppy (registered trademark) disc, hard disc, etc.), an optical disk (CD-ROM, DVD, etc.), a semiconductor memory, etc., as a program that can be executed by a computer, and may be distributed in a form of such recording medium.

In addition, the data of the program for realizing each of the above-described methods can be transmitted on a communication network in a form of a program code, and the data of the program can be taken in a computer of an electronic device connected to the communication network. Thereby, the above-described function of generating problem setting data corresponding to the content of the lecture and the function of setting the problem of the problem data can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information display apparatus comprising:
a display; and
a processor, the processor being configured to:
display a text in a first display area of the display;
display, in a second display area of the display, a location indicator indicating a location of a portion of the text displayed in the first display area;
display, in a third display area of the display, the portion of the text at the location indicated by the location indicator in an enlarged manner such that a display size of the portion of the text in the third display area is larger than a display size of the portion of the text displayed in the first display area, wherein the processor updates the portion of the text displayed in the third display area in accordance with a user operation to move the location indicator to indicate a new location;
detect a user operation to specify and designate a previously undesignated character string in the portion of the text displayed in the third display area, and change a display state of the designated character string from an original display state in which the character string was displayed when it was undesignated to a changed display state to visually indicate that the character string has been designated by the user operation, wherein the processor is operable to detect the user operation to specify and designate any character string in the text displayed on the display such that the designated character string is not a character string that has been predetermined to be designated prior to detection of the user operation to specify and designate the character string;
determine, by referring to a memory in which a plurality of keywords are stored in advance, whether a keyword among the plurality of keywords stored in advance is included in a part of the designated character string;
if it is determined that the keyword is included in the part of the designated character string, change a display state of the keyword such that the keyword is visually distinguishable from another part of the character string, and generate problem setting data based on the keyword included in the designated character string; and
transmit the problem setting data to an external terminal, wherein the processor is further configured to:
display an image in the third display area; and
in a case in which the keyword is included in the designated character string and a user operation is detected to designate a part of the image corresponding to the keyword, change a display state of the designated part of the image to visually indicate that the part has been designated and to generate the problem setting data based on the designated character string, the keyword, and the designated part of the image.

2. The information display apparatus according to claim 1, wherein the display comprises a touch panel-equipped color display.

3. The information display apparatus according to claim 1, wherein the external terminal includes an external information display terminal.

4. The information display apparatus according to claim 1, wherein the processor generates, if the keyword is included in the part of the designated character string, the problem setting data based on the designated character string and the keyword.

5. The information display apparatus according to claim 1, wherein the processor generates a problem in accordance with the problem setting data and causes the display to display the problem.

6. The information display apparatus according to claim 1, wherein the processor sets a problem-setting level of a problem in accordance with the problem setting data.

7. The information display apparatus according to claim 6, wherein the processor transmits the set problem-setting level to the external terminal.

8. The information display apparatus according to claim 6, wherein the processor generates a problem in accordance with the problem setting data at the set problem-setting level and causes the display to display the problem.

9. The information display apparatus according to claim 1, wherein the processor:
re-designates a part of the designated character string in accordance with a user operation, and
generates the problem setting data based on the designated character string, the keyword, and the re-designated part of the character string.

10. The information display apparatus according to claim 9, wherein the processor:

sets a problem-setting level of a problem in accordance with the problem setting data, and generates, if the set problem-setting level is a first problem-setting level, a problem in accordance with the problem setting data as a problem corresponding to the whole of the designated character string, and causes the display to display the problem, and generates, if the set problem-setting level is a second problem-setting level, a problem in accordance with the problem setting data as a problem corresponding to the designated character string except for the re-designated part of the character string, and causes the display to display the problem.

11. The information display apparatus according to claim 1, wherein the processor generates, if a plurality of character strings in the displayed text are designated in accordance with a user operation and there are a plurality of designated character strings that include a keyword from among the plurality of keywords stored in advance, the problem setting data in which the keyword is hidden.

12. The information display apparatus according to claim 1, wherein the processor generates the problem setting data in which the designated image part is hidden.

13. The information display apparatus according to claim 1, wherein the processor associates, if the keyword is included in the designated character string, the designated character string and the designated image part with each other, and generates the problem setting data in which a part of the designated character string and the designated image part are hidden.

14. The information display apparatus according to claim 1, wherein the processor, when a plurality of character strings in the displayed text are designated in accordance with a user operation, if there are a plurality of designated character strings that include a keyword among the plurality of keywords stored in advance, and if there are a plurality of the designated image parts, generates the problem setting data for confirming that the designated character string that includes the keyword and the designated image part are in consistency.

15. A method of controlling an information display apparatus, the method comprising, by a processor:

displaying a text in a first display area of a display;

displaying, in a second display area of the display, a location indicator indicating a location of a portion of the text displayed in the first display area;

displaying, in a third display area of the display, the portion of the text at the location indicated by the location indicator in an enlarged manner such that a display size of the portion of the text in the third display area is larger than a display size of the portion of the text displayed in the first display area, wherein the processor updates the portion of the text displayed in the third display area in accordance with a user operation to move the location indicator to indicate a new location;

detecting a user operation to specify and designate a previously undesignated character string in the portion of the text displayed in the third display area, and change a display state of the designated character string from an original display state in which the character string was displayed when it was undesignated to a changed display state to visually indicate that the character string has been designated by the user operation, wherein the processor is operable to detect the user operation to specify and designate any character string in the text displayed on the display such that the designated character string is not a character string that has been predetermined to be designated prior to detection of the user operation to specify and designate the character string;

determining, by referring to a memory in which a plurality of keywords are stored in advance, whether a keyword among the plurality of keywords stored in advance is included in a part of the designated character string;

if it is determined that the keyword is included in the part of the designated character string, changing a display state of the keyword such that the keyword is visually distinguishable from another part of the character string, and generating problem setting data based on the keyword included in the designated character string; and transmitting the problem setting data to an external terminal, wherein the method further comprises:

displaying an image in the third display area; and in a case in which the keyword is included in the designated character string and a user operation is detected to designate a part of the image corresponding to the keyword, changing a display state of the designated part of the image to visually indicate that the part has been designated and to generate the problem setting data based on the designated character string, the keyword, and the designated part of the image.

16. A non-transitory recording medium having a processor-readable program recorded thereon that is executable to cause a processor to:

display a text in a first display area of the display;

display, in a second display area of the display, a location indicator indicating a location of a portion of the text displayed in the first display area;

display, in a third display area of the display, the portion of the text at the location indicated by the location indicator in an enlarged manner such that a display size of the portion of the text in the third display area is larger than a display size of the portion of the text displayed in the first display area, wherein the processor updates the portion of the text displayed in the third display area in accordance with a user operation to move the location indicator to indicate a new location;

detect a user operation to specify and designate a previously undesignated character string in the portion of the text displayed in the third display area, and change a display state of the designated character string from an original display state in which the character string was displayed when it was undesignated to a changed display state to visually indicate that the character string has been designated by the user operation, wherein the processor is operable to detect the user operation to specify and designate any character string in the text displayed on the display such that the designated character string is not a character string that has been predetermined to be designated prior to detection of the user operation to specify and designate the character string;

determine, by referring to a memory in which a plurality of keywords are stored in advance, whether a keyword among the plurality of keywords stored in advance is included in a part of the designated character string;

if it is determined that the keyword is included in the part of the designated character string, change a display state of the keyword such that the keyword is visually distinguishable from another part of the character string, and generate problem setting data based on the keyword included in the designated character string; and transmit the problem setting data to an external terminal, wherein the program further causes the processor to:
display an image in the third display area; and
in a case in which the keyword is included in the designated character string and a user operation is detected to designate a part of the image corresponding to the keyword, change a display state of the designated part of the image to visually indicate that the part has been designated and to generate the problem setting data based on the designated character string, the keyword, and the designated part of the image.

* * * * *